(12) United States Patent
Lester et al.

(10) Patent No.: US 11,089,661 B2
(45) Date of Patent: Aug. 10, 2021

(54) DEFROSTING APPARATUS WITH REPOSITIONABLE ELECTRODES

(71) Applicant: NXP USA, Inc., Austin, TX (US)

(72) Inventors: David Paul Lester, Phoenix, AZ (US); Lionel Mongin, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 420 days.

(21) Appl. No.: 16/221,315

(22) Filed: Dec. 14, 2018

(65) Prior Publication Data
US 2020/0196403 A1    Jun. 18, 2020

(51) Int. Cl.
| H05B 6/62 | (2006.01) |
|---|---|
| H05B 6/54 | (2006.01) |
| H05B 6/66 | (2006.01) |
| A23L 3/365 | (2006.01) |

(52) U.S. Cl.
CPC ............... *H05B 6/62* (2013.01); *A23L 3/365* (2013.01)

(58) Field of Classification Search
CPC .............. A23L 3/365; H05B 6/54; H05B 6/62
USPC ....... 219/680, 771, 775, 388, 774, 780, 679; 99/358, 451, DIG. 14, 345; 165/63, 64
See application file for complete search history.

(56) References Cited

U.S. PATENT DOCUMENTS

| 2,633,400 A | 3/1953 | Ring |
|---|---|---|
| 3,271,169 A | 9/1966 | Baker et al. |
| 3,302,632 A | 2/1967 | Fichtner |
| 3,797,870 A | 3/1974 | Beckman |
| 4,303,820 A | 12/1981 | Stottmann et al. |
| 4,333,521 A | 6/1982 | Stottman et al. |
| 4,812,609 A | 3/1989 | Butol |
| 4,978,826 A * | 12/1990 | DeRuiter ................. H05B 6/50 219/771 |
| 4,980,530 A | 12/1990 | Butot |
| 5,266,766 A | 11/1993 | Hecox |

(Continued)

FOREIGN PATENT DOCUMENTS

| CN | 108521691 A | 9/2018 |
|---|---|---|
| CN | 108812854 A | 11/2018 |

(Continued)

OTHER PUBLICATIONS

Final Office Action; U.S. Appl. No. 15/721,256; 31 pages (dated Oct. 14, 2020).

(Continued)

*Primary Examiner* — Quang T Van

(57) ABSTRACT

A defrosting system includes a radio frequency (RF) signal source, at least one electrode proximate to a cavity within which a load to be defrosted is positioned, a transmission path between the RF signal source and the electrode, at least one bus bar in the transmission path that includes multiple ports to which the electrode may be coupled, a repositionable shelf that is attached to the electrode, and multiple support structures disposed at side-walls of the cavity that support the repositionable shelf. Standoff isolators may attach the electrode to the repositionable shelf and may electrically isolate the electrode from the repositionable shelf. The vertical position of the electrode may be changed by moving the repositionable shelf to be supported by different support structures of the multiple support structures while coupling the electrode to a different port of the multiple ports of the bus bar.

20 Claims, 9 Drawing Sheets

(56) References Cited

U.S. PATENT DOCUMENTS

| | | | |
|---|---|---|---|
| 5,541,392 A | 7/1996 | Miklos | |
| 5,556,567 A * | 9/1996 | Landwehr | H05B 6/50 219/771 |
| 6,278,093 B1 | 8/2001 | Lacovacci et al. | |
| 6,486,455 B1 | 11/2002 | Merabet | |
| 6,784,405 B2 | 8/2004 | Flugstad et al. | |
| 8,207,479 B2 | 6/2012 | Ben-Shmuel et al. | |
| 8,637,797 B2 | 1/2014 | Imura | |
| 9,215,756 B2 | 12/2015 | Bilchinsky et al. | |
| 9,265,097 B2 | 2/2016 | Torres et al. | |
| 9,318,818 B2 | 4/2016 | Nakamura et al. | |
| 2003/0068414 A1 | 4/2003 | Ito | |
| 2006/0081624 A1 | 4/2006 | Takada et al. | |
| 2011/0016887 A1 | 1/2011 | Lee et al. | |
| 2012/0122072 A1 | 5/2012 | Bilchinsky et al. | |
| 2015/0295552 A1 | 10/2015 | Abou-Chahine et al. | |
| 2015/0351164 A1 | 12/2015 | Wesson et al. | |
| 2017/0181455 A1 | 6/2017 | Bullo et al. | |
| 2018/0042074 A1 | 2/2018 | Qiu et al. | |
| 2019/0104575 A1 | 4/2019 | Lester et al. | |
| 2020/0120959 A1 | 4/2020 | Wu et al. | |

FOREIGN PATENT DOCUMENTS

| | | |
|---|---|---|
| CN | 109259045 A | 1/2019 |
| GB | 621320 | 4/1949 |
| GB | 844154 A | 8/1960 |
| JP | S5579970 A | 6/1980 |
| JP | S57102169 A | 6/1982 |
| JP | 2003-024025 A | 1/2003 |
| JP | 2003038148 A | 2/2003 |
| JP | 2004-247128 A | 9/2004 |
| JP | 4311997 B2 | 8/2009 |
| JP | 2012207900 | 10/2012 |
| JP | 2013111107 A | 6/2013 |
| TW | M478803 U | 5/2014 |

OTHER PUBLICATIONS

U.S. Appl. No. 16/594,215; not yet published; 50 pages (dated Oct. 7, 2019).

U.S. Appl. No. 15/721,256; 73 pages; (dated Sep. 29, 2017).

Non Final Office Action; U.S. Appl. No. 15/721,256; 25 pages (dated Apr. 2, 2020).

* cited by examiner

US 11,089,661 B2

DEFROSTING APPARATUS WITH REPOSITIONABLE ELECTRODES

TECHNICAL FIELD

Embodiments of the subject matter described herein relate generally to apparatus and methods of defrosting a load using radio frequency (RF) energy.

BACKGROUND

Conventional capacitive food defrosting (or thawing) systems include large planar electrodes contained within a heating compartment. After a food load is placed between the electrodes and the electrodes are brought into contact with the food load, low power electromagnetic energy is supplied to the electrodes to provide controlled warming of the food load. As the food load thaws during the defrosting operation, the impedance of the food load changes. Accordingly, the power transfer to the food load also changes during the defrosting operation. The duration of the defrosting operation may be determined, for example, based on the weight of the food load, and a timer may be used to control cessation of the operation.

Although good defrosting results are possible using such systems, variations in the size of the food load may result in inefficient defrosting of the food load. What are needed are apparatus and methods for defrosting food loads (or other types of loads) that may result in efficient and even defrosting throughout the load.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
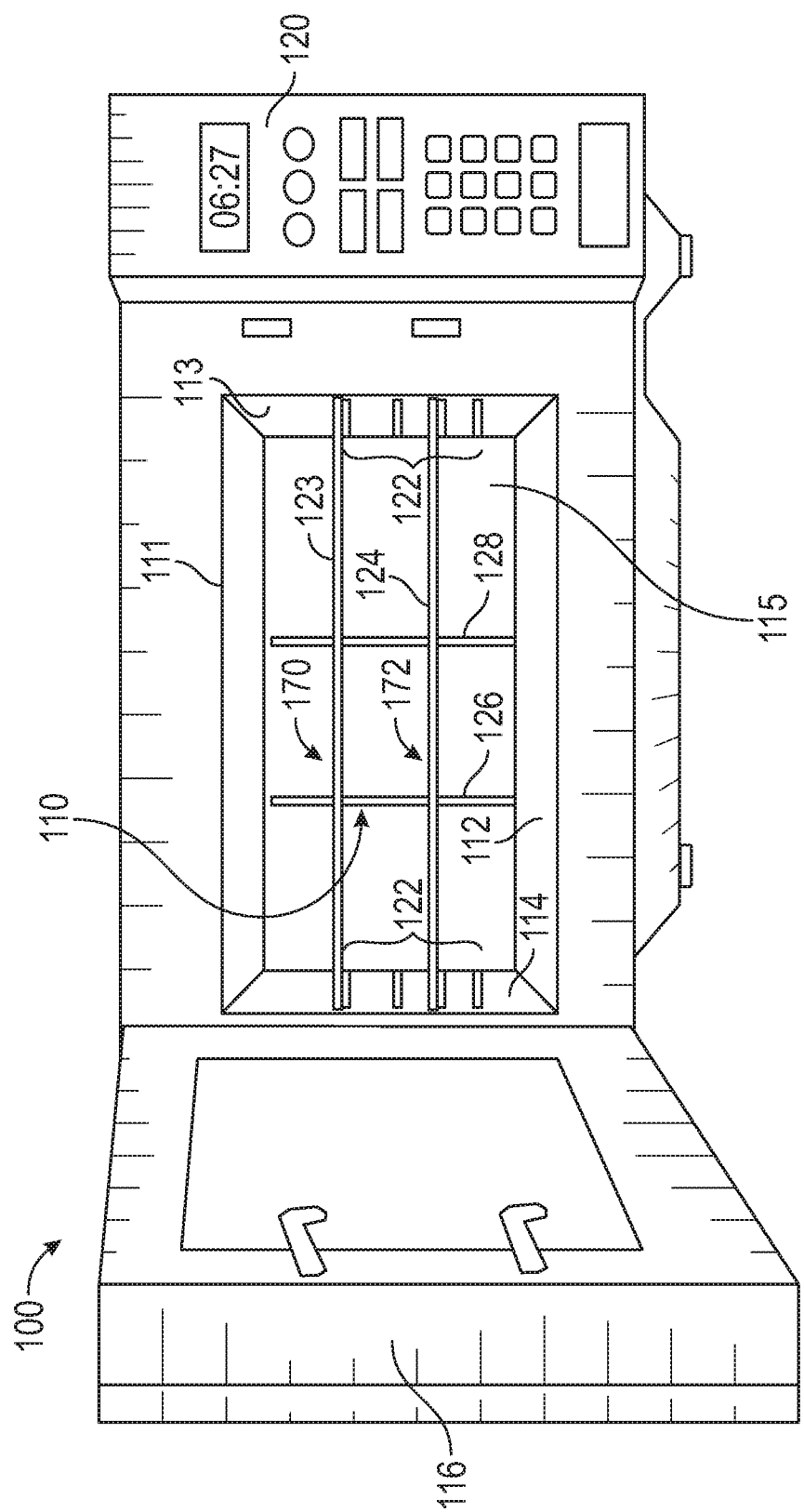
FIG. 1 is a perspective view of a defrosting appliance, in accordance with an example embodiment.

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of the subject matter described herein relate to solid-state defrosting apparatus that may be incorporated into stand-alone appliances or into other systems. As described in greater detail below, embodiments of solid-state defrosting apparatus include both "unbalanced" defrosting apparatus and "balanced" apparatus. For example, exemplary "unbalanced" defrosting systems are realized using a first electrode disposed in a cavity. In contrast, exemplary "balanced" defrosting systems are realized using first and second electrodes disposed in a cavity.

Generally, the term "defrosting" means to elevate the temperature of a frozen load (e.g., a food load or other type of load) to a temperature at which the load is no longer frozen (e.g., a temperature at or near 0 degrees Celsius). As used herein, the term "defrosting" more broadly means a process by which the thermal energy or temperature of a load (e.g., a food load or other type of load) is increased through provision of RF power to the load. Accordingly, in various embodiments, a "defrosting operation" may be performed on a load with any initial temperature (e.g., any initial temperature above or below 0 degrees Celsius), and the defrosting operation may be ceased at any final temperature that is higher than the initial temperature (e.g., including final temperatures that are above or below 0 degrees Celsius). That said, the "defrosting operations" and "defrosting systems" described herein alternatively may be referred to as "thermal increase operations" and "thermal increase systems." The term "defrosting" should not be construed to limit application of the invention to methods or systems that are only capable of raising the temperature of a frozen load to a temperature at or near 0 degrees Celsius.

Conventional heating systems (e.g., microwaves, toaster ovens, conventional ovens, etc.) are generally unsuitable for integration of an RF defrosting system to enable a fast defrosting function for frozen food items or other applicable loads. This is because the load-containing cavities of such conventional systems generally have a relatively large inner height (e.g., 20-30 cm for microwaves and toaster ovens, 50-80 cm for conventional ovens) between the floor and ceiling of the cavity. If the electric field generated during RF defrosting operations were required to extend across such a distance, defrosting efficiency, which may be defined as a ratio of the amount of energy input to the defrosting cavity to the amount of energy absorbed by the load, would generally be low or, in some cases, defrosting would not be possible. Thus, in order to concentrate the electric field in accordance with various embodiments, a pair of conductive (e.g., metal or partially metal) plates may be inserted into the cavity. The presence of these conductive plates, sometimes referred to herein as "repositionable electrodes", may concentrate the electric field produced by the application of RF energy to one of the electrodes in the space between the two electrodes. Additionally, when inserted into the cavity, one or both of the electrodes may connect to one or more bus bars located at one or more walls of the cavity. For example, one of the electrodes may be electrically connected to a first output of an RF subsystem (e.g., to receive an unbalanced RF signal or to receive a first balanced RF signal) through a first bus bar. In embodiments with two electrodes, the other electrode may be connected to a second output of the RF subsystem (e.g., to receive a second balanced RF signal) or to a common or ground voltage through a second bus bar. In the above examples, both electrodes may be repositionable. However, in other embodiments, one electrode may be in a fixed position while the other may be repositionable. By providing one or more repositionable electrodes, a defrosting system may be adapted to accommodate loads of different sizes, thus allowing for increased flexibility, and/or placement of loads within different areas of the system without reducing RF defrosting efficiency due to weakening of the electric field.

FIG. 1 is a perspective view of a defrosting system 100, in accordance with an example embodiment. Defrosting system 100 includes a defrosting cavity 110 (e.g., cavity 360, 460, 560, FIGS. 3, 4, 5), a control panel 120, one or more radio frequency (RF) signal sources (e.g., RF signal source 320, 420, FIGS. 3, 4), a power supply (e.g., power supply 326, 426, FIGS. 3, 4), a first repositionable electrode 170 (e.g., first repositionable electrode 340, 440, 540, FIGS. 3, 4, 5), a repositionable shelf 123 that includes the first repositionable electrode 170, a second repositionable electrode 172 (e.g., second repositionable electrode 472, 550, FIGS. 4, 5), a repositionable shelf 124 that includes the second repositionable electrode 172, a system controller (e.g., system controller 312, 412, FIGS. 3, 4), and support structures 122. In some embodiments, the first repositionable electrode 170 and the second repositionable electrode 172 may be electrically conductive (e.g., metal) material embedded, respectively, in the repositionable shelves 123 and 124. In other embodiments, the repositionable shelves 123 and 124 may each be entirely electrically conductive such that entire repositionable shelf 123 makes up the first repositionable electrode 170 and the entire repositionable shelf 124 makes up the second repositionable electrode 172. In some embodiments, the repositionable shelves 123 and 124 may be wire racks that respectively support the repositionable electrodes 170 and 172 and that are respectively electrically insulated from the repositionable electrodes 170 and 172 by standoff isolators (e.g., standoff isolators 530, FIGS. 6, 7).

The defrosting cavity 110 is defined by interior surfaces of top, bottom, side, and back cavity walls 111, 112, 113, 114, 115 and an interior surface of door 116. With door 116 closed, the defrosting cavity 110 defines an enclosed air cavity. As used herein, the term "air cavity" may mean an enclosed area or volume that contains air or other gasses (e.g., defrosting cavity 110). The repositionable shelves 123 and 124 may be supported by opposing pairs of the support structures 122. The support structures 122 may be rails attached to the walls 113 and 114 or may be recessed portions of the walls 113 and 114, for example.

According to an "unbalanced" embodiment, the first repositionable electrode 170 is electrically coupled to the RF signal source from which it receives an RF signal via a bus bar 128 (e.g., bus bar 502, FIG. 5) that is disposed at the back cavity wall 115, while the second repositionable electrode 172 is electrically coupled to a ground terminal via a bus bar 126 (e.g., bus bar 504, FIG. 5) that is disposed at the back cavity wall 115. In an alternate embodiment, the second repositionable electrode 172 may be electrically coupled to the ground terminal via contact with the support structures 122. In such a configuration, the system may be simplistically modeled as a capacitor, where the first repositionable electrode 170 functions as one conductive plate (or electrode), the second repositionable electrode 172 functions as a second conductive plate (or electrode), and the air cavity (including any load contained therein) between the electrodes 170, 172 functions as a dielectric medium between the first and second conductive plates. Although not shown in FIG. 1, a non-electrically conductive barrier (e.g., barrier 362, 462, FIGS. 3, 4) also may be included in the system 100, and the non-conductive barrier may function to electrically and physically isolate the load (e.g., separate the load) from the second repositionable electrode 172. In another alternate embodiment, the second repositionable electrode may be omitted, and some or all of the cavity walls 111, 112, 113, 114, 115 may be grounded, with either the top wall 111 or the bottom wall 112 acting as the second, grounded electrode.

According to a "balanced" embodiment, the first repositionable electrode 170 is electrically coupled to the RF signal source from which it receives a first RF signal via the bus bar 128 (e.g., bus bar 502, FIG. 5), while the second repositionable electrode 172 is electrically coupled to a the RF signal source from which it receives a second RF signal via the bus bar 126 (e.g., bus bar 504, FIG. 5), where the first and second RF signals are balanced RF signals. In such a configuration, the system also may be simplistically modeled as a capacitor, where the first repositionable electrode 170 functions as one conductive plate (or electrode), the second repositionable electrode 172 functions as a second conductive plate (or electrode), and the air cavity (including any load contained therein) between the electrodes 170, 172 functions as a dielectric medium between the first and second conductive plates. Although not shown in FIG. 1, a non-electrically conductive barrier (e.g., barrier 462, FIG. 4) also may be included in the system 100, and the non-conductive barrier may function to electrically and physically isolate (e.g., separate) the load from the second repositionable electrode 172.

According to an embodiment, during operation of the defrosting system 100, a user (not illustrated) may place the repositionable shelf 124 at a first selected location within the defrosting cavity 110, and may place the repositionable shelf 123 at a second selected location within the defrosting cavity 110 (e.g., above the repositionable shelf 124), such that the repositionable shelves 123 and 124 are supported by different respective pairs of the support structures 122. For example, when a user intends to heat a small load (e.g., a load with a relatively small height), the repositionable shelves 123 and 124 may be positioned closer together compared to when the user intends to heat a larger load (e.g., a load with a relatively large height). Generally, the user may selectively place the repositionable shelves 123 and 124 at locations within the defrosting cavity 110 that provides the minimum distance between the repositionable shelf 124 and the repositionable shelf 123 while still providing enough space to accommodate a load that the user intends to place on the repositionable shelf 124. Once the repositionable shelves 123 and 124 are secured in the cavity 110, the user may place one or more loads (e.g., food and/or liquids) into the defrosting cavity 110 (e.g., between the repositionable shelf 124 and the repositionable shelf 123), and optionally may provide inputs via the control panel 120 that specify characteristics of the load(s). For example, the specified characteristics may include an approximate weight of the load. In addition, the specified load characteristics may indicate the material(s) from which the load is formed (e.g., meat, bread, liquid). In alternate embodiments, the load characteristics may be obtained in some other way, such as by scanning a barcode on the load packaging or receiving a radio frequency identification (RFID) signal from an RFID tag on or embedded within the load. Either way, as will be described in more detail later, information regarding such load characteristics can enable the system controller to control the RF heating process.

To begin the defrosting operation, the user may provide an input via the control panel 120. In response, the system controller causes the RF signal source(s) (e.g., RF signal source 320, 420, FIGS. 3, 4) to supply an RF signal to the first or second repositionable electrode 170, 172 in an unbalanced embodiment, or to supply first and second balanced RF signals to both the first and second repositionable electrodes 170, 172 in a balanced embodiment, and the electrode(s) responsively radiate electromagnetic energy into the defrosting cavity 110. The electromagnetic energy increases the thermal energy of the load (i.e., the electromagnetic energy causes the load to warm up).

During the defrosting operation, the impedance of the load (and thus the total input impedance of the cavity 110 plus load) changes as the thermal energy of the load increases. The impedance changes alter the absorption of RF energy into the load, and thus alter the magnitude of reflected power. According to an embodiment, power detection circuitry (e.g., RF detection circuitry, not shown) continuously or periodically measures the reflected power (e.g., the magnitude and optionally the phase of the reflected power) in a transmission path (e.g., transmission path 328, 428/430, FIGS. 3, 4) between the RF signal source (e.g., RF signal source 320, 420, FIGS. 3, 4) and the electrode(s) 170, 172, and in some embodiments, also measures forward power (e.g., the magnitude and optionally the phase of the forward power). Based on these measurements, the system controller (e.g., system controller 312, 412, FIGS. 3, 4) may detect completion of the defrosting operation. According to a further embodiment, a variable impedance matching network (e.g., network 370, 470, FIGS. 3, 4) is disposed along the transmission path for the RF signal, and based on the reflected power measurements (or both the forward and reflected power measurements), the system controller may alter the state of the impedance matching network during the defrosting operation to increase the absorption of RF power by the load (e.g., to decrease the reflected power).

Figure 2:
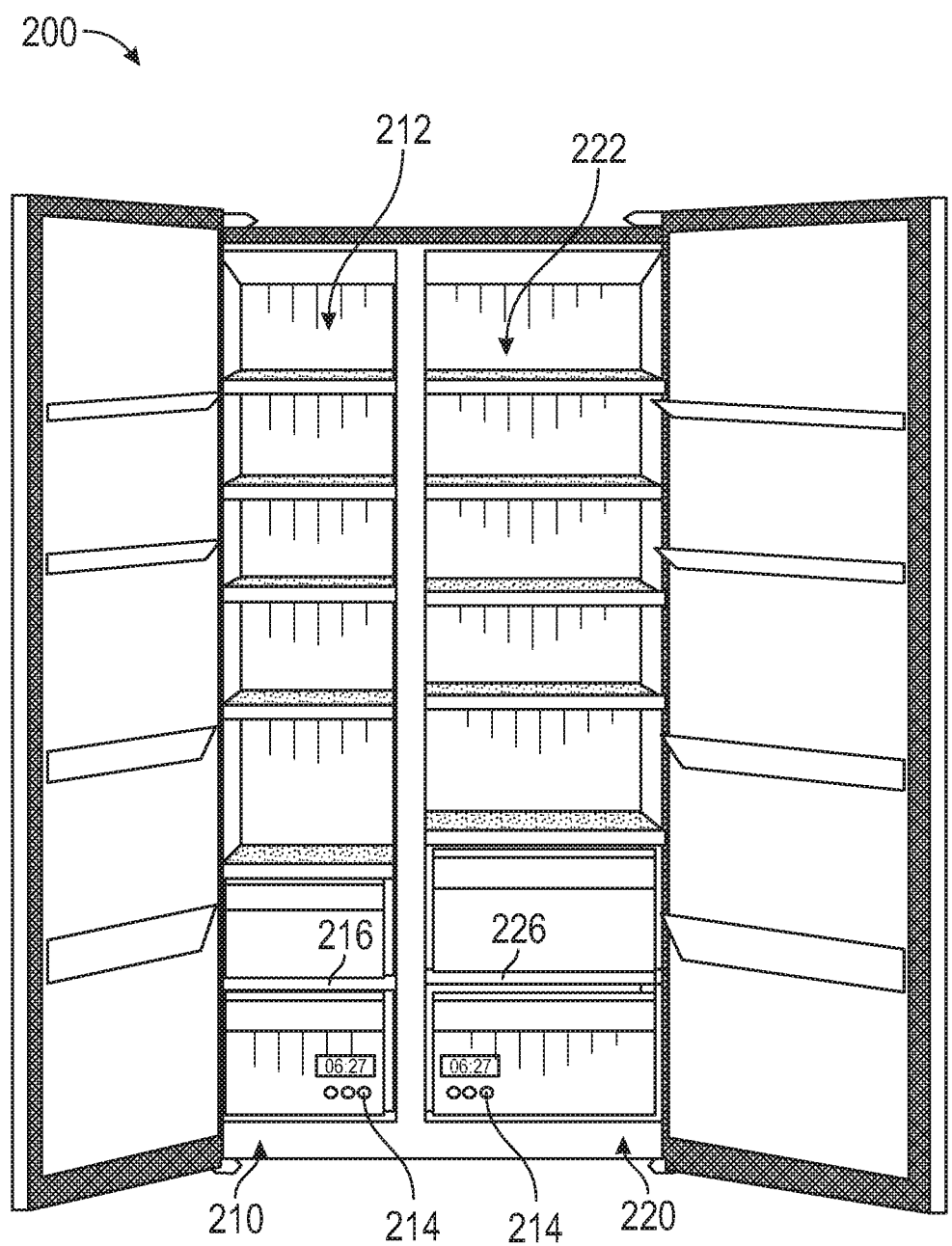
FIG. 2 is a perspective view of a refrigerator/freezer appliance that includes other example embodiments of defrosting systems.

The defrosting system 100 of FIG. 1 is embodied as a counter-top type of appliance. Alternatively, components of a defrosting system may be incorporated into other types of systems or appliances. For example, FIG. 2 is a perspective view of a refrigerator/freezer appliance 200 that includes other example embodiments of defrosting systems 210, 220. More specifically, defrosting system 210 is shown to be incorporated within a freezer compartment 212 of the system 200, and defrosting system 220 is shown to be incorporated within a refrigerator compartment 222 of the system. An actual refrigerator/freezer appliance likely would include only one of the defrosting systems 210, 220, but both are shown in FIG. 2 to concisely convey both embodiments.

Figure 3:
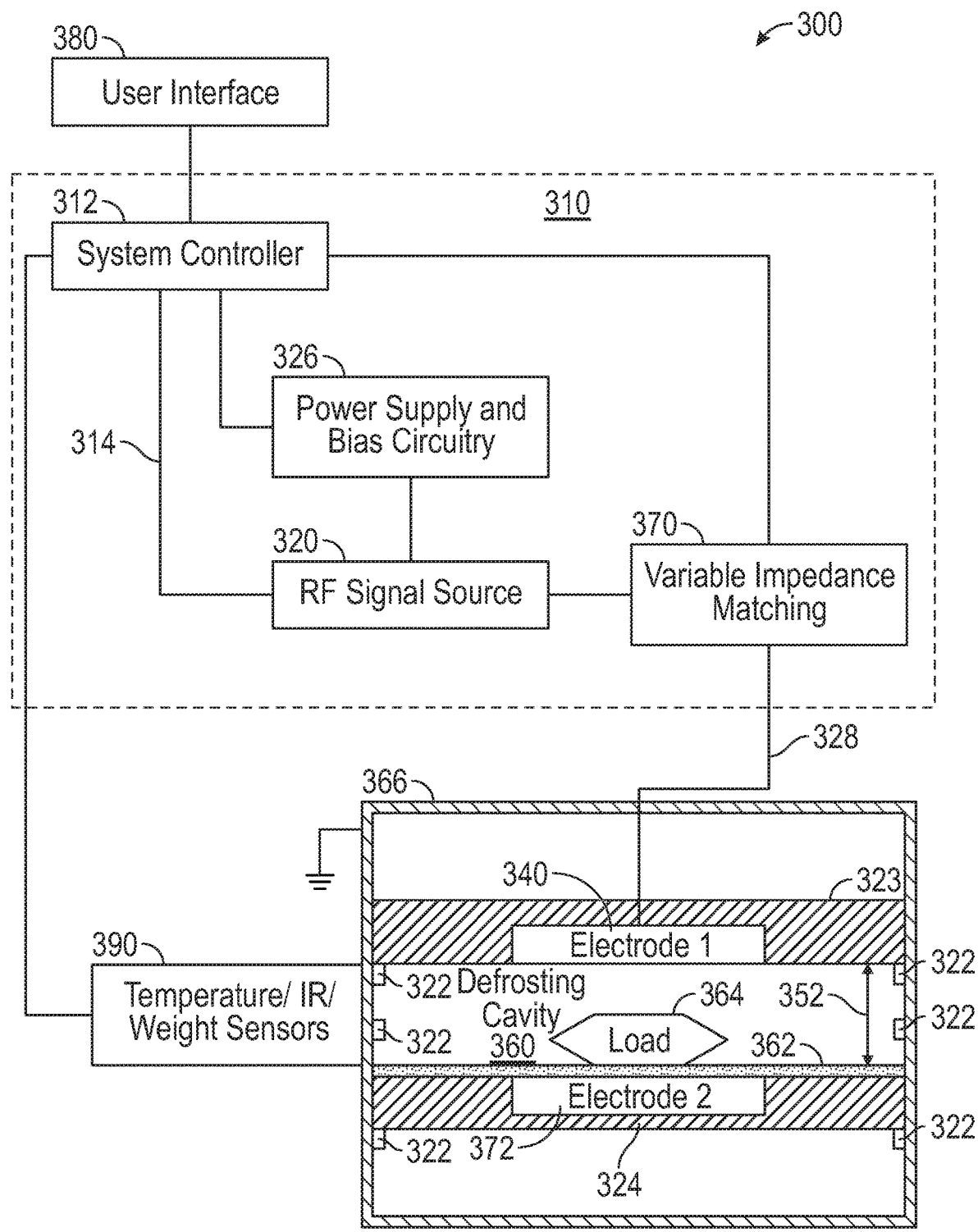
FIG. 3 is a simplified block diagram of an unbalanced defrosting apparatus, in accordance with an example embodiment.
Figure 4:
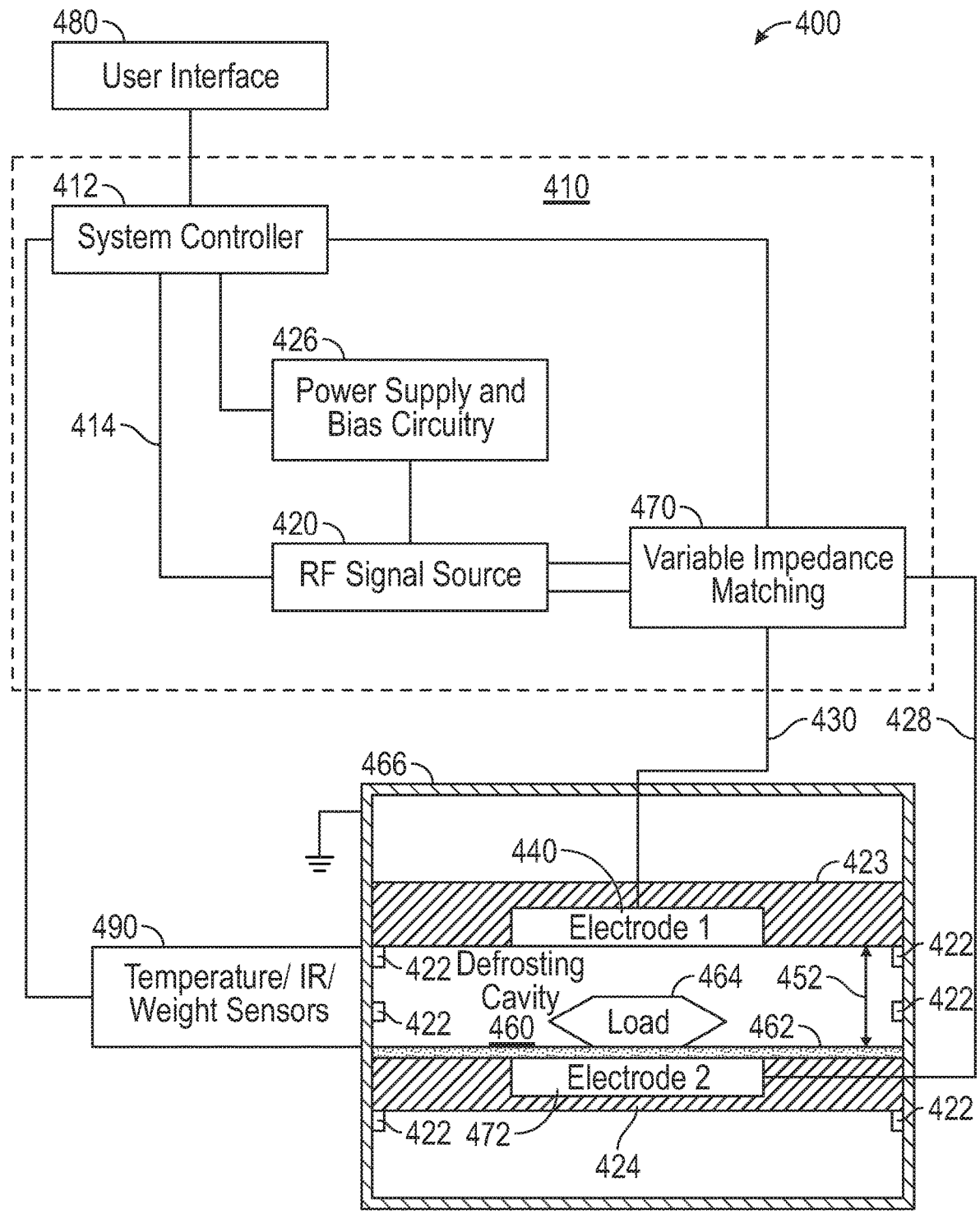
FIG. 4 is a simplified block diagram of a balanced defrosting apparatus, in accordance with another example embodiment.

Similar to the defrosting system 100, each of defrosting systems 210, 220 includes a defrosting cavity, a control panel 214, 224, one or more RF signal sources (e.g., RF signal source 320, 420, FIGS. 3, 4), a power supply (e.g., power supply 326, 426, FIGS. 3, 4), a first repositionable electrode (e.g., electrode 170, 340, 440, 540, FIGS. 1, 3, 4, 5), multiple support structures (e.g., support structures 122, 322, 422, 516, 518, FIGS. 1, 3, 4, 5) disposed at opposing interior walls of the defrosting cavity, a first repositionable shelf (e.g., repositionable shelf 123, FIG. 1) that is supported by a pair of the support structures and that includes the first repositionable electrode, a second repositionable shelf (e.g., repositionable shelf 124, FIG. 1) that is supported by another pair of the support structures and that includes the second repositionable electrode, and a system controller (e.g., system controller 312, 412, FIGS. 3, 4). For example, the defrosting cavity may be defined by interior surfaces of bottom, side, front, and back walls of a containment structure (e.g., containment structure 366, 466, 566, FIGS. 3, 4, 5), with the support structures being disposed at the side walls of the containment structure. The front wall of the containment structure may be a door or other structure capable of being opened and closed, which when closed creates an enclosed air cavity. The components and functionalities of the defrosting systems 210, 220 may be substantially the same as the components and functionalities of defrosting system 100, in various embodiments.

In addition, according to an embodiment, each of the defrosting systems 210, 220 may have sufficient thermal communication with the freezer or refrigerator compartment 212, 222, respectively, in which the system 210, 220 is disposed. In such an embodiment, after completion of a defrosting operation, the load may be maintained at a safe temperature (i.e., a temperature at which food spoilage is prevented) until the load is removed from the system 210, 220. More specifically, upon completion of a defrosting operation by the freezer-based defrosting system 210, the cavity within which the defrosted load is contained may thermally communicate with the freezer compartment 212, and if the load is not promptly removed from the cavity, the load may re-freeze. Similarly, upon completion of a defrosting operation by the refrigerator-based defrosting system 220, the cavity within which the defrosted load is contained may thermally communicate with the refrigerator compartment 222, and if the load is not promptly removed from the cavity, the load may be maintained in a defrosted state at the temperature within the refrigerator compartment 222.

Those of skill in the art would understand, based on the description herein, that embodiments of defrosting systems may be incorporated into systems or appliances having other configurations, as well. Accordingly, the above-described implementations of defrosting systems in a stand-alone appliance, a freezer, and a refrigerator are not meant to limit use of the embodiments only to those types of systems.

Although defrosting systems 100, 200 are shown with their components in particular relative orientations with respect to one another, it should be understood that the various components may be oriented differently, as well. In addition, the physical configurations of the various components may be different. For example, control panels 120, 214, 224 may have more, fewer, or different user interface elements, and/or the user interface elements may be differently arranged. In addition, although a substantially cubic defrosting cavity 110 is illustrated in FIG. 1, it should be understood that a defrosting cavity may have a different shape, in other embodiments (e.g., cylindrical, and so on). Further, defrosting systems 100, 210, 220 may include additional components (e.g., a fan, a stationary or rotating plate, a tray, an electrical cord, and so on) that are not specifically depicted in FIGS. 1, 2.

FIG. 3 is a simplified block diagram of an unbalanced defrosting system 300 (e.g., defrosting system 100, 210, 220, FIGS. 1, 2), in accordance with an example embodiment. Defrosting system 300 includes RF subsystem 310, defrosting cavity 360, user interface 380, system controller 312, RF signal source 320, power supply and bias circuitry 326, a first repositionable electrode 340 (e.g., repositionable electrode 170, FIG. 1), support structures 322 (e.g., support structures 122, 516, 518, FIGS. 1, 5), a repositionable shelf 323 (e.g., repositionable shelf 123, FIG. 1) that is supported by a pair of the support structures 322 and that includes the first repositionable electrode 340, a second repositionable electrode 372 (e.g., repositionable electrode 172, FIG. 1), a repositionable shelf 324 (e.g., repositionable shelf 124, FIG. 1) that is supported by another pair of the support structures 322 and that includes the second electrode 372, a non-conductive barrier 362 disposed over the repositionable shelf 324, and a containment structure 366, in an embodiment. In some embodiments, the first and second repositionable electrodes 340 and 372 may be conductive material embedded in or disposed on the repositionable shelves 323 and 324, respectively (e.g., in or on non-conductive material thereof). In other embodiments, the repositionable shelves 323 and 324 may be entirely conductive material such that all of the repositionable shelf 323 acts as the first repositionable electrode 340, and all of the repositionable shelf 324 acts as the second repositionable electrode 372. In some embodiments, the repositionable shelves 323 and 324 may be wire racks that respectively support the repositionable electrodes 340 and 372 and that are respectively electrically insulated from the repositionable electrodes 340 and 372 by standoff isolators (e.g., standoff isolators 530, FIGS. 6, 7). It should be understood that FIG. 3 is a simplified representation of a defrosting system 300 for purposes of explanation and ease of description, and that practical embodiments may include other devices and components to provide additional functions and features, and/or the defrosting system 300 may be part of a larger electrical system.

User interface 380 may correspond to a control panel (e.g., control panel 120, 214, 224, FIGS. 1, 2), for example, that enables a user to provide inputs to the defrosting system 300 regarding parameters for a defrosting operation (e.g., characteristics of the load to be defrosted, and so on), start and cancel buttons, mechanical controls (e.g., a door/drawer open latch), and so on. In addition, the user interface may be configured to provide user-perceptible outputs indicating the status of a defrosting operation (e.g., a countdown timer, visible indicia indicating progress or completion of the defrosting operation, and/or audible tones indicating completion of the defrosting operation) and other information.

Some embodiments of defrosting system 300 may include temperature sensor(s), infrared (IR) sensor(s), and/or weight sensor(s) 390, although some or all of these sensor components may be excluded. The temperature sensor(s) and/or IR sensor(s) may be positioned in locations that enable the temperature of a load 364 to be sensed during the defrosting operation. When provided to the system controller 312, the temperature information may enable the system controller 312 to alter the power of the RF signal supplied by the RF signal source 320 (e.g., by controlling the bias and/or supply voltages provided by the power supply and bias circuitry 326), and/or to determine when the defrosting operation should be terminated. The weight sensor(s) may be positioned under the load 364, and are configured to provide an estimate of the weight of the load 364 to the system controller 312. The system controller 312 may use this information, for example, to determine a desired power level for the RF signal supplied by the RF signal source 320, and/or to determine an approximate duration for the defrosting operation.

The RF subsystem 310 includes a system controller 312, an RF signal source 320, a variable impedance matching network 370, and power supply and bias circuitry 326, in an embodiment. System controller 312 may include one or more general purpose or special purpose processors (e.g., a microprocessor, microcontroller, Application Specific Integrated Circuit (ASIC), and so on), volatile and/or non-volatile memory (e.g., Random Access Memory (RAM), Read Only Memory (ROM), flash, various registers, and so on), one or more communication busses, and other components. According to an embodiment, system controller 312 is coupled to user interface 380, RF signal source 320, and sensors 390 (if included). System controller 312 can provide control signals to the power supply and bias circuitry 326 and to the RF signal source 320. In addition, the system controller 312 provides control signals to the variable impedance matching network 370, which cause the network 370 to change its state or configuration.

Defrosting cavity 360 includes a capacitive defrosting arrangement with first and second parallel plate electrodes that are separated by an air cavity within which a load 364 to be defrosted may be placed. For example, the first repositionable electrode 340 may be positioned above the air cavity, and the second repositionable electrode 372 may be positioned below the air cavity. More specifically, the containment structure 366 may include bottom, top, and side walls, and a door or hatch for containment structure 366, the interior surfaces of which define the cavity 360 (e.g., cavity 110, FIG. 1). The support structures 322 may be disposed at side walls of the containment structure 366, and the repositionable shelf 323 that includes the first electrode 340 and the repositionable shelf 324 that includes the second electrode 372 may be selectively placed (e.g., by a user) on different pairs of the support structures 322, which allows the size of the air cavity between the first and second electrodes 340 and 372 to be modified (e.g., for the accommodation of different sized loads). According to an embodiment, the cavity 360 may be sealed (e.g., with a door 116, FIG. 1) to contain the electromagnetic energy that is introduced into the cavity 360 during a defrosting operation. The system 300 may include one or more interlock mechanisms that ensure that the seal is intact during a defrosting operation. If one or more of the interlock mechanisms indicates that the seal is breached, the system controller 312 may cease the defrosting operation. According to an embodiment, the containment structure 366 is at least partially formed from conductive material, and the conductive portion(s) of the containment structure 366 may be grounded. Further, in some embodiments, the second repositionable electrode 372 may be electrically coupled to the grounded containment structure 366 through a bus bar (e.g., the bus bar 126, 504, FIGS. 1, 5) located at a wall (e.g., the rear wall 115 or a side wall 113, 114, FIG. 1) of the containment structure 366. Alternatively, the second repositionable electrode 372 may be electrically coupled to the grounded containment structure 366 through the support structures 322. In an alternate embodiment, the second repositionable electrode 372 may be electrically coupled to a separate ground terminal via the bus bar, and the support structures 322 may be non-conductive and may insulate the electrode 372 from the containment structure 366. To avoid direct contact between the load 364 and the top surface of the second repositionable electrode 372, a non-conductive barrier 362 may be positioned over the second repositionable electrode 372.

Essentially, defrosting cavity 360 includes a capacitive defrosting arrangement with first and second parallel plate electrodes 340, 372 that are separated by an air cavity within which a load 364 to be defrosted may be placed. The second repositionable electrode 372 is positioned within the containment structure 366 to define a distance 352 between the first repositionable electrode 340 and an opposed surface of the second electrode 372, where the distance 352 is at least equal to the minimal distance required to accommodate the load 364, in an embodiment.

In various embodiments, the distance 352 is in a range of about 0.10 meters to about 1.0 meter, although the distance may be smaller or larger, as well. The distance 352 may change as the repositionable shelves 323 and 324 are moved to be disposed on different pairs of the support structures 322 (e.g., to accommodate loads of varying size).

The first repositionable electrode 340 and the second repositionable electrode 372 may be capacitively coupled when an RF signal is applied to the electrode 340 by the RF signal source 320. More specifically, the first repositionable electrode 340 may be analogized to a first plate of a capacitor, the second repositionable electrode 372 may be analogized to a second plate of a capacitor, and the load 364, barrier 362, and air within the cavity 360 between electrodes 340, 372 may be analogized to a capacitor dielectric.

Essentially, the voltage across the first repositionable electrode 340 and the second repositionable electrode 372 heats the load 364 within the cavity 360. According to various embodiments, the RF subsystem 310 is configured to generate the RF signal to produce voltages between the first repositionable electrode 340 and the second repositionable electrode 372 in a range of about 90 volts to about 3,000 volts, in one embodiment, or in a range of about 3000 volts to about 10,000 volts, in another embodiment, although the system may be configured to produce lower or higher voltages between the first repositionable electrode 340 and the second repositionable electrode 372, as well.

The first repositionable electrode 340 is electrically coupled to the RF signal source 320 via the variable impedance matching network 370 and a conductive transmission path 328, which may include a plurality of conductors. According to an embodiment, the conductive transmission path 328 is an "unbalanced" path, which is configured to carry an unbalanced RF signal (i.e., a single RF signal referenced against ground). In some embodiments, one or more connectors (not shown, but each having male and female connector portions) may be electrically coupled along the transmission path 328, and the portion of the transmission path 328 between the connectors may comprise a coaxial cable or other suitable connector.

The variable impedance matching network 370 may include, in an embodiment, an arrangement of variable and (optionally) non-variable passive components, such as resistors, capacitors, and/or inductors. The variable impedance matching network 370 may be configured to perform an impedance transformation from an output impedance of the RF signal source 320 (e.g., about 10 ohms) to "match" an input impedance of the defrosting cavity 360, as modified by the load 364 (e.g., on the order of hundreds or thousands of ohms, such as about 1000 ohms to about 4000 ohms or more). As the temperature of the load 364 increases over the course of a defrosting operation, the impedance of the defrosting cavity 360 plus load 364 will change. The system controller 312 may therefore adjust the impedance of the variable impedance matching network 370 over the course of a defrosting operation to account for changes in the impedance of the defrosting cavity 360. In some embodiments, the system controller 312 may perform this adjustment of the variable impedance matching network 370 in response to detecting that S11 parameters of the system have exceeded a predefined threshold (e.g., using power detection circuitry, not shown, disposed along the path 328).

In response to control signals provided by system controller 312 over connection 314, RF signal source 320 is configured to produce an oscillating electrical signal. The RF signal source 320 may be controlled to produce oscillating signals of different power levels and/or different frequencies, in various embodiments. For example, the RF signal source 320 may produce a signal that oscillates in a range of about 10.0 megahertz (MHz) to about 100 MHz and/or from about 100 MHz to about 3.0 gigahertz (GHz).

In the embodiment of FIG. 3, the RF signal source 320 may include multiple amplifier stages, such as a driver amplifier stage and a final amplifier stage, to generate an amplified output signal. For example, the output signal of the RF signal source 320 may have a power level in a range of about 100 watts to about 400 watts or more.

The gain applied by the power amplifier may be controlled using gate bias voltages and/or drain supply voltages provided by the power supply and bias circuitry 326 to the one or more amplifier stages. More specifically, power supply and bias circuitry 326 provides bias and supply voltages to each RF amplifier stage in accordance with control signals received from system controller 312.

In an embodiment, RF signal source 320 includes a laterally diffused metal oxide semiconductor FET (LDMOS-FET) transistor configured to amplify an input RF signal to provide the RF signal to variable impedance matching network 370. However, it should be noted that the transistors are not intended to be limited to any particular semiconductor technology, and in other embodiments, each transistor may be realized as a gallium nitride (GaN) transistor, another type of MOSFET transistor, a bipolar junction transistor (BJT), or a transistor utilizing another semiconductor technology.

Defrosting cavity 360 and any load 364 (e.g., food, liquids, and so on) positioned in the defrosting cavity 360 present a cumulative load for the electromagnetic energy (or RF power) that is radiated into the cavity 360 by the first electrode 340. More specifically, the cavity 360 and the load 364 present an impedance to the system, referred to herein as a "cavity input impedance." The cavity input impedance changes during a defrosting operation as the temperature of the load 364 increases.

Electrical power is supplied to the RF signal source 320 by the power supply and bias circuitry 326. Power supply and bias circuitry 326 generally outputs a direct current (DC) voltage to the RF signal source 320, where the DC voltage may be in the range of 0 volts to 65 volts. The magnitude of the DC voltage outputted by power supply and bias circuitry 326 may be set or determined by system controller 312. For example, based upon inputs received from the user interface 380 and the sensors 390, system controller 312 may select an appropriate output voltage for power supply and bias circuitry 326. The output voltage may be greater, for example, for loads 364 having a greater weight than for loads that weigh less. Based upon those various inputs, the system controller 312 may utilize a look-up table to determine a suitable output voltage for power supply and bias circuitry 326. In some embodiments, the system controller 312 may cause the output voltage of power supply and bias circuitry 326 to vary throughout a defrosting process for a particular load 364.

To achieve the different output DC voltages of power supply and bias circuitry 326, the power supply and bias circuitry 326 may be configured to be a variable power supply capable of generating and outputting those different output voltages. But, in other embodiments, the power supply and bias circuitry 326 may be configured to generate a fixed output voltage. In that case, the defrosting system 300 may incorporate a pulse-width modulation circuit configured to modulate that fixed output voltage into variable output voltages (e.g., voltages ranging from 0 volts to 65 volts) that may be utilized to operate the RF signal source 320 and implement the functionality of the defrosting system 300.

FIG. 3 and the related discussion, describe an "unbalanced" defrosting apparatus, in which an RF signal is applied to one repositionable electrode (e.g., first repositionable electrode 340, FIG. 3), and the other repositionable electrode (e.g., second repositionable electrode 372, FIG. 3) is grounded. In other embodiments, the RF signal and ground may be applied to opposite electrodes (e.g., an RF signal is applied to second repositionable electrode 372, and the first repositionable electrode 340 is grounded). As mentioned above, an alternate embodiment of a defrosting apparatus comprises a "balanced" defrosting apparatus. In such an apparatus, RF signals are provided to both repositionable electrodes.

For example, FIG. 4 is a simplified block diagram of a balanced defrosting system 400 (e.g., defrosting system 100, 210, 220, FIGS. 1, 2), in accordance with another example embodiment. Defrosting system 400 includes RF subsystem 410, defrosting cavity 460, user interface 480, system controller 412, RF signal source 420, power supply and bias circuitry 426, first and second repositionable electrodes 440 and 472, support structures 422 disposed at walls of the containment structure 466, a repositionable shelf 423 that includes the first repositionable electrode 440 and that is supported by a pair of the support structures 422, and a repositionable shelf 424 that includes the second repositionable electrode 472 and that is supported by another pair of the support structures 422, in an embodiment. In some embodiments, the first and second repositionable electrodes 440 and 472 may include conductive material respectively embedded in or disposed on the repositionable shelves 423 and 424 (e.g., in or on non-conductive material thereof). In other embodiments, the repositionable shelves 423 and 424 may be entirely conductive such that all of the repositionable shelf 423 acts as the first repositionable electrode 440, and all of the repositionable shelf 424 acts as the second repositionable electrode 472. In yet other embodiments, the repositionable shelves 423 and 424 may be wire racks that are respectively attached to and electrically insulated from the first and second repositionable electrodes 440 and 472 by standoff isolators (e.g., standoff isolators 530, FIGS. 6, 7). In addition, in other embodiments, defrosting system 400 may include temperature sensor(s), IR sensor(s), and/or weight sensor(s) 490, although some or all of these sensor components may be excluded. It should be understood that FIG. 4 is a simplified representation of defrosting system 400 for purposes of explanation and ease of description, and that practical embodiments may include other devices and components to provide additional functions and features, and/or the defrosting system 400 may be part of a larger electrical system.

User interface 480 may correspond to a control panel (e.g., control panel 120, 214, 224, FIGS. 1, 2), for example, which enables a user to provide inputs to the system regarding parameters for a defrosting operation (e.g., characteristics of the load to be defrosted, and so on), start and cancel buttons, mechanical controls (e.g., a door/drawer open latch), and so on. In addition, the user interface may be configured to provide user-perceptible outputs indicating the status of a defrosting operation (e.g., a countdown timer, visible indicia indicating progress or completion of the defrosting operation, and/or audible tones indicating completion of the defrosting operation) and other information.

The RF subsystem 410 includes a system controller 412, an RF signal source 420, and power supply and bias circuitry 426, in an embodiment. System controller 412 may include one or more general purpose or special purpose processors (e.g., a microprocessor, microcontroller, ASIC, and so on), volatile and/or non-volatile memory (e.g., RAM, ROM, flash, various registers, and so on), one or more communication busses, and other components. According to an embodiment, system controller 412 is operatively and communicatively coupled to user interface 480, RF signal source 420, and power supply and bias circuitry 426. System controller 412 is configured to receive signals indicating user inputs received via user interface 480 and sensor(s) 490. Responsive to the received signals, system controller 412 provides control signals to the power supply and bias circuitry 426 and/or to the RF signal source 420. In addition, the system controller 412 provides control signals to the variable impedance matching network 470, which cause the network 470 to change its state or configuration.

Defrosting cavity 460 includes a capacitive defrosting arrangement with first and second parallel plate electrodes 440, 472 that are separated by an air cavity within which a load 464 to be defrosted may be placed. Within a containment structure 466, first and second electrodes 440, 472 (e.g., electrodes 170, 172, FIG. 1) are positioned opposite to one another on either side of an interior defrosting cavity 460 (e.g., interior cavity 110, FIG. 1).

The first and second electrodes 440, 472 are separated across the cavity 460 by a distance 452. In various embodiments, the distance 452 is in a range of about 0.10 meters to about 1.0 meter, although the distance may be smaller or larger, as well. The distance 452 may change as the repositionable selves 423 and 424 are moved to be disposed on different pairs of the support structures 422 (e.g., to accommodate loads of varying size). The first and second electrodes 440, 472 may be capacitively coupled when balanced RF signals are applied to the electrodes 440, 472 by the RF signal source 420. More specifically, the first electrode 440 may be analogized to a first plate of a capacitor, the second electrode 472 may be analogized to a second plate of a capacitor, and the load 464, barrier 462, and air within the cavity 460 between the electrodes 440, 472 may be analogized to a capacitor dielectric.

Essentially, the voltage across the first and second electrodes 440, 472 heats the load 464 within the cavity 460. According to various embodiments, the RF subsystem 410 is configured to generate the RF signal to produce voltages across the electrodes 440, 472 in a range of about 90 volts to about 3000 volts, in one embodiment, or in a range of about 3000 volts to about 10,000 volts, in another embodiment, although the system may be configured to produce lower or higher voltages across electrodes 440, 472, as well.

Outputs of the RF subsystem 410, and more particularly outputs of the variable impedance matching network 470, are electrically coupled to electrodes 440, 472 via conductive paths 430, 428, respectively. For example, the RF subsystem 410 may output two balanced RF signals, one provided to electrode 440 along path 430 and the other provided to electrode 472 along path 428. These balanced RF signals may be, for example, produced as the outputs of a balun, a push-pull amplifier, or a balanced amplifier that has received an unbalanced RF signal from RF signal source 420.

The variable impedance matching network 470 may include, in an embodiment, an arrangement of variable and (optionally) non-variable passive components, such as resistors, capacitors, and/or inductors. The variable impedance matching network 470 may be configured to perform an impedance transformation from an output impedance of the RF signal source 420 (e.g., about 10 ohms) to "match" an input impedance of the defrosting cavity 460, as modified by the load 464 (e.g., on the order of hundreds or thousands of ohms, such as about 1000 ohms to about 4000 ohms or more).

Defrosting cavity 460 and any load 464 (e.g., food, liquids, and so on) positioned in the defrosting cavity 460 present a cumulative load for the electromagnetic energy (or RF power) that is radiated into the cavity 460 by the electrodes 440, 472. More specifically, the cavity 460 and the load 464 present an impedance to the system, referred to as a cavity input impedance. The cavity input impedance changes during a defrosting operation as the temperature of the load 464 increases. The system controller 412 may therefore adjust the impedance of the variable impedance matching network 470 over the course of a defrosting operation to account for changes in the impedance of the defrosting cavity 460 plus load 464. In some embodiments, the system controller 412 may perform this adjustment of the variable impedance matching network 470 in response to detecting that S11 parameters of the system have exceeded a predefined threshold (e.g., using power detection circuitry disposed along the path 428 and/or 430, not shown).

In response to control signals provided by system controller 412 over connection 414, RF signal source 420 is configured to produce an oscillating electrical signal. The RF signal source 420 may be controlled to produce oscillating signals of different power levels and/or different frequencies, in various embodiments. For example, the RF signal source 420 may produce a signal that oscillates in a range of about 10.0 MHz to about 100 MHz and/or from about 100 MHz to about 3.0 GHz.

In the embodiment of FIG. 4, the RF signal source 420 may include multiple amplifier stages, such as a driver amplifier stage and a final amplifier stage, to generate an amplified output signal. For example, the output signal of the RF signal source 420 may have a power level in a range of about 100 watts to about 400 watts or more.

The gain applied by the power amplifier may be controlled using gate bias voltages and/or drain supply voltages provided by the power supply and bias circuitry 426 to each amplifier stage. More specifically, power supply and bias circuitry 426 provides bias and supply voltages to each RF amplifier stage in accordance with control signals received from system controller 412.

In an embodiment, RF signal source 420 may include transistors of different designs not limited to any particular semiconductor technology. Such transistors may include LDMOS transistors, GaN transistors, other types of MOSFETs, BJTs, or transistors utilizing another semiconductor technology.

Electrical power is supplied to the RF signal source 420 by the power supply and bias circuitry 426. Power supply and bias circuitry 426 generally outputs a DC voltage to the RF signal source 420, where the DC voltage may be in the range of 0 volts to 65 volts. The magnitude of the DC voltage outputted by power supply and bias circuitry 426 may be set or determined by system controller 412. For example, based upon inputs received from the user interface 480 and the sensors 490, system controller 412 may select an appropriate output voltage for power supply and bias circuitry 426. The output voltage may be greater, for example, for loads 464 having a greater weight than for loads that weigh less. Based upon those various inputs, the system controller 412 may utilize a look-up table to determine a suitable output voltage for power supply and bias circuitry 426. In some embodiments, the system controller 412 may cause the output voltage of power supply and bias circuitry 426 to vary throughout a defrosting process for a particular load 464.

To achieve the different output DC voltages of power supply and bias circuitry 426, the power supply and bias circuitry 426 may be configured to be a variable power supply capable of generating and outputting those different output voltages. But, in other embodiments, the power supply and bias circuitry 426 may be configured to generate a fixed output voltage. In that case, the defrosting system 400 may incorporate a pulse-width modulation circuit configured to modulate that fixed output voltage into variable output voltages (e.g., voltages ranging from 0 volts to 65 volts) that may be utilized to operate the RF signal source 420 and implement the functionality of the defrosting system 400.

Figure 5:
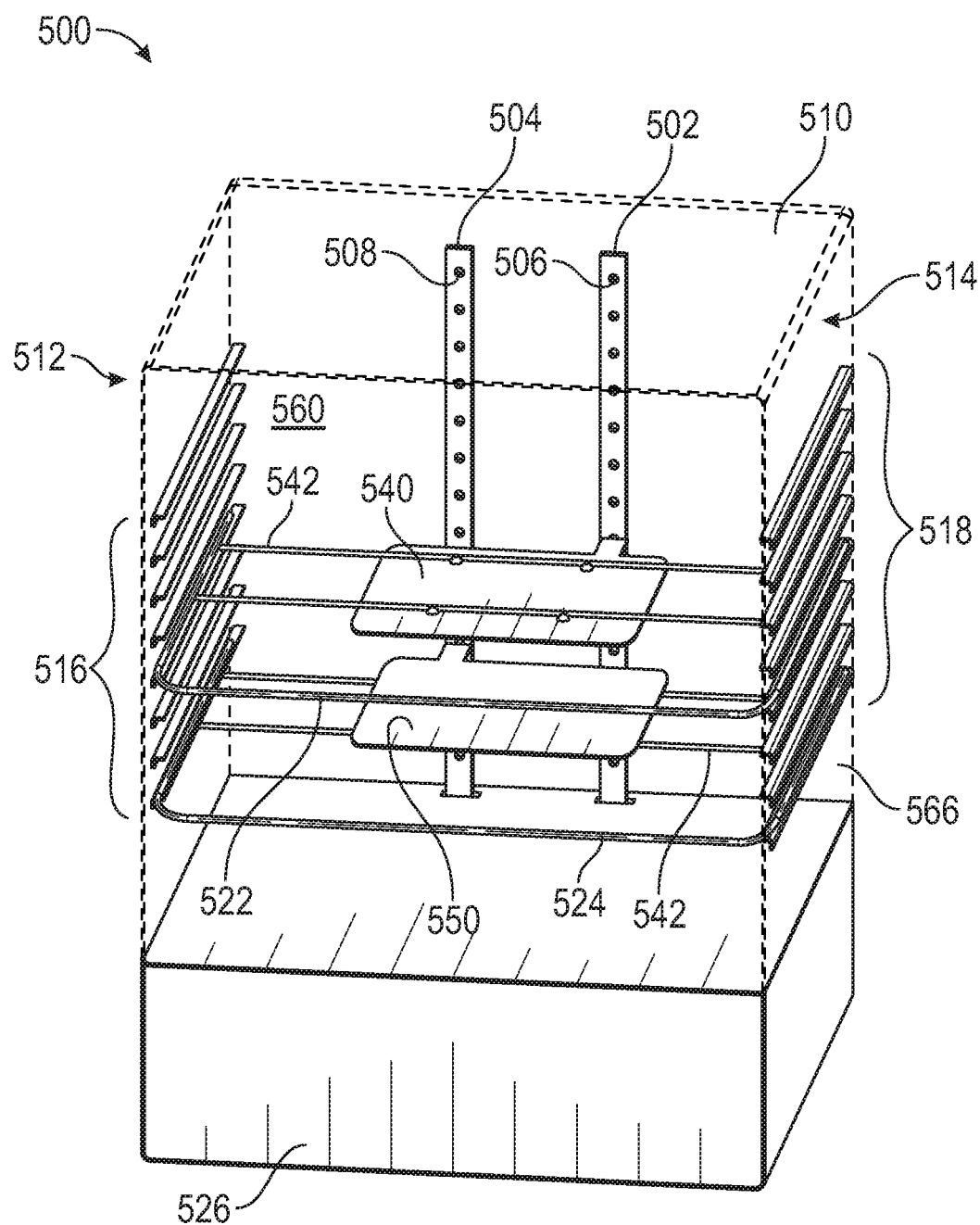
FIG. 5 is a perspective view of a defrosting system having repositionable electrodes, in accordance with an example embodiment.

FIG. 5 shows an illustrative defrosting system 500 (e.g., defrosting system 300, 400, FIGS. 3, 4), sometimes referred to herein as a "thermal increase system", which may be operated to defrost or otherwise increase the temperature of a load placed between an upper repositionable electrode 540 (e.g., electrode 170, 340, 440 FIGS. 1, 3, 4, sometimes referred to as a first repositionable electrode) and a lower repositionable electrode 550 (e.g., electrode 172, 372, 472, FIGS. 1, 3, 4, sometimes referred to as a second repositionable electrode) within a cavity 560 (e.g., cavity 110, 360, 460, FIGS. 1, 3, 4) defined by a containment structure 566 (e.g., containment structure 366, 466, FIGS. 3, 4). As shown, a lower surface of upper repositionable electrode 540 may face an upper surface of lower repositionable electrode 550 so that the electrodes are arranged as parallel plates. It should be noted that in embodiments where the system 500 is an unbalanced defrosting system, the lower repositionable electrode 550 may be removed, and the bottom wall (e.g., floor) of the containment structure 566 may be electrically grounded and may function as the lower electrode. Alternatively, the upper repositionable electrode 540 may be removed and the top wall (e.g., ceiling) of the containment structure 566 may be electrically grounded and may function as the upper electrode.

As shown, bus bars 502 and 504, repositionable shelves 522 and 524 (e.g., which may be solid or wire racks), and support structures 516 and 518 (e.g., which may be conductive or insulating rails attached to, integrally formed with, or otherwise disposed at side walls of the cavity 560) may also be located in the cavity 560. The bus bar 502 may be mounted to or otherwise disposed at a rear interior wall 510 of the containment structure 566 (or at another wall) and may include multiple ports 506 disposed along its length. Similarly, the bus bar 504 may be mounted to or otherwise disposed at the rear interior wall 510 of the containment structure 566 (or at another wall) and may include ports 508 disposed along its length. In some embodiments, the bus bars 502 and 504 may instead be disposed outside the cavity 560. For example, the bus bars 502 and 504 may be disposed on or at an exterior (i.e., exterior to the cavity 560) surface of the rear interior wall 510, and the ports 506 and 508 of the bus bars 502 and 504 may be aligned with corresponding holes in the rear interior wall 510 so that the bus bars 502 and 504 may be connected to the electrodes 540 and 550.

The electrodes 540 and 550 are repositionable in that they may be placed at various selectable positions (e.g., heights) within containment structure 566 by engaging the electrodes 540, 550 with different sets of corresponding ports 506, 508, which allows for the flexibility of choosing where, in the containment structure 566, a defrosting operation will be performed and of adjusting the distance between the electrodes 540 and 550 to accommodate loads of various sizes. The selectable positions may be discrete (e.g., defined by the support structures 516 and 518 and by the locations of ports 506 or 508). For example, the upper repositionable electrode 540 and the lower repositionable electrode 550 may be separately removed and reinserted at various locations within the cavity 560, so that loads of different sizes may be accommodated between the electrodes 540 and 550, and so that the user may minimize the distance between the electrodes 540 and 550 when accommodating a given load (or minimize the distance between the upper surface of the load and the upper electrode 540). Selectively positioning the electrodes 540 and 550 in this way may provide better defrosting efficiency for the system 500. As used here, to "minimize" the distance between the electrodes 540 and 550 refers to arranging the electrodes 540 and 550 in the cavity 560 so as to reduce the distance between the electrodes 540 and 550 to a reasonably small distance, with the upper repositionable electrode 540 being brought into close proximity to the load, desirably without coming into physical contact with the load.

While the repositionable nature of the electrodes 540 and 550 allows for improved defrosting efficiency of the system 500 via the minimization of the distance between the electrodes 540 and 550, it should be noted that this minimization is generally dependent on the judgement of the user. It follows that some users, when attempting to increase the temperature of a load with a comparatively small height, may unknowingly reduce the defrosting efficiency of the system 500, for example, by placing the electrodes 540 and 550 in the cavity 560 such that the distance between the upper repositionable electrode 540 and the lower repositionable electrode 550 is significantly greater than the height of the load (e.g., beyond a predefined threshold). In such a scenario, the cavity 560 may appear to the system 500 to be empty. For example, the system may identify the cavity 560 as being empty or having improperly positioned electrodes when the impedance of the cavity, as observed by the system 500, corresponds to a predefined impedance (or range of impedances) associated with an empty cavity (e.g., an empty cavity impedance threshold or range stored in a memory of the system 500). When the system 500 detects that the impedance of the cavity 560 plus load corresponds to an empty cavity impedance, the system 500 may provide an alert to the user that the cavity is either empty or that the electrodes 540 and 550 should be repositioned (e.g., placed closer together).

The electrodes 540, 550 and the bus bars 502, 504 have corresponding connector portions that are configured to engage with each other to hold the electrodes 540, 550 in fixed positions with respect to the bus bars 502, 504. For example, the corresponding connector portions may include plugs coupled to the electrodes 540, 550 and the aforementioned ports 506, 508 within the bus bars 502, 504. To position the upper repositionable electrode 540 at a selected location within the cavity 560, the electrode 540 may be aligned with one of the ports 506 such that a plug (e.g., a banana plug) of the upper repositionable electrode 540 may be inserted into that port. Similarly, one of the ports 508 of the bus bar 504 may receive a plug of the lower repositionable electrode 550 when the lower repositionable electrode 550 is positioned at a corresponding location within the cavity. The bus bars 502 and 504 may be at least partially formed from electrically conductive material (e.g., copper, aluminum). As will be described, by inserting the first connector portions (e.g., plugs) of the electrodes 540 and 550 into the corresponding second connector portions (e.g., ports 506 and 508, respectively) of the bus bars 502, 504, the electrodes 540 and 550 may be electrically coupled to an RF signal source, a voltage source, a ground terminal, or a combination of these, depending on the embodiment. The connection between the electrodes 540 and 550 and the bus bars 502 and 504 may further act to physically support, partially or entirely, the electrodes 540 and 550.

The repositionable shelves 522 and 524 may provide additional support for the electrodes 540 and 550, respectively. The repositionable shelf 522 may be attached to the upper repositionable electrode 540 via support rods extending across the upper repositionable electrode 540 and may be supported on opposite ends by a first corresponding pair of support structures 516 and 518 (e.g., support structures 322, 422, FIGS. 3, 4), where the first corresponding pair of support structures 516, 518 includes at least one first support structure 516 coupled to a first wall 512 of the chamber 560, and at least one second support structure 518 coupled to a second wall 514 of the chamber 560 at a same height as the first support structure(s) 516. The repositionable shelf 524 may be attached to the lower repositionable electrode 550 via support rods extending across the lower repositionable electrode 550 and may be supported on opposite ends by a second corresponding pair of support structures 516 and 518), where the second corresponding pair of support structures 516, 518 includes at least one third support structure 516 coupled to the first wall 512 of the chamber 560, and at least one fourth support structure 518 coupled to the second wall 514 of the chamber 560 at a same height as the third support structure(s) 516. For embodiments where the repositionable shelves 522 and 524 are wire racks, support rods of the repositionable shelves 522 and 524 may be formed from conductive material (e.g., brass, copper, aluminum, or steel) in some embodiments, while in other embodiments these support rods may be formed from electrically insulating dielectric material (e.g., heat resistant plastic material such as thermoset polymer, ceramic material such as alumina, fiberglass material, such as fiberglass containing alumino-borosilicate glass, and/or mica). The support structures 516 may be attached to or integrally formed with an interior surface of a wall 512 of the containment structure 566. The support structures 518 may be attached to or integrally formed with another interior surface of a wall 514 of the containment structure 566, where the wall 512 opposes the wall 514.

In some embodiments, circuitry, such as a system controller (e.g., system controller 312, 412, FIGS. 3, 4), power supply and bias circuitry (e.g., power supply and bias circuitry 326, 426, FIGS. 3, 4), an RF signal source (e.g., RF signal source 320, 420, FIGS. 3, 4), and variable and non-variable impedance matching networks (e.g., variable impedance matching network 370, 470, FIGS. 3, 4), may be housed within a base structure 526 disposed below the containment structure 566. In some embodiments, a top surface of the base structure 526 may form a bottom wall of the containment structure 566, while in other embodiments, the containment structure 566 may have a separate bottom wall that rests on the top surface of the base structure 526. The bus bars 502 and 504 may extend into the base structure 526 and there either may connect to the RF signal source, a voltage source of the power supply and bias circuitry, or a ground terminal. In some embodiments, the containment structure 566 may be electrically grounded, and either of the bus bars 502 and 504 may be electrically connected to ground via a connection to the containment structure 566. In an alternate embodiment, the above circuitry may instead be housed in a cavity (not shown) located adjacent to the rear wall 510, with connections between the circuitry and the cavity being made through openings in the rear wall 510. In another alternate embodiment, the above circuitry may instead be housed in a cavity (not shown) located above and resting on the containment structure 566, with connections between the circuitry and the cavity being made through openings in the ceiling (e.g., top wall) of the containment structure 566.

In some embodiments, one or both of the bus bars 502 and 504 may be electrically insulated from the containment structure 566. In such embodiments, dielectric material (e.g., heat resistant plastic material such as thermoset polymer, ceramic material such as alumina, fiberglass material, such as fiberglass containing alumino-borosilicate glass, rubber material, and/or mica) may be interposed between the containment structure 566 and one or both of the bus bars 502 and 504. Additionally or alternatively, the conductive material of the bus bars 502 and 504 may be anodized or otherwise encapsulated in electrically insulating material to prevent electrical contact between the bus bars 502 and 504 and the rear wall 510 of the containment structure 566. The interior surfaces of the ports 506 and 508 may remain free from anodization or encapsulation so that electrical connections can still be made between the ports 506 and 508 and the plugs of the electrodes 540 and 550.

Figure 6:
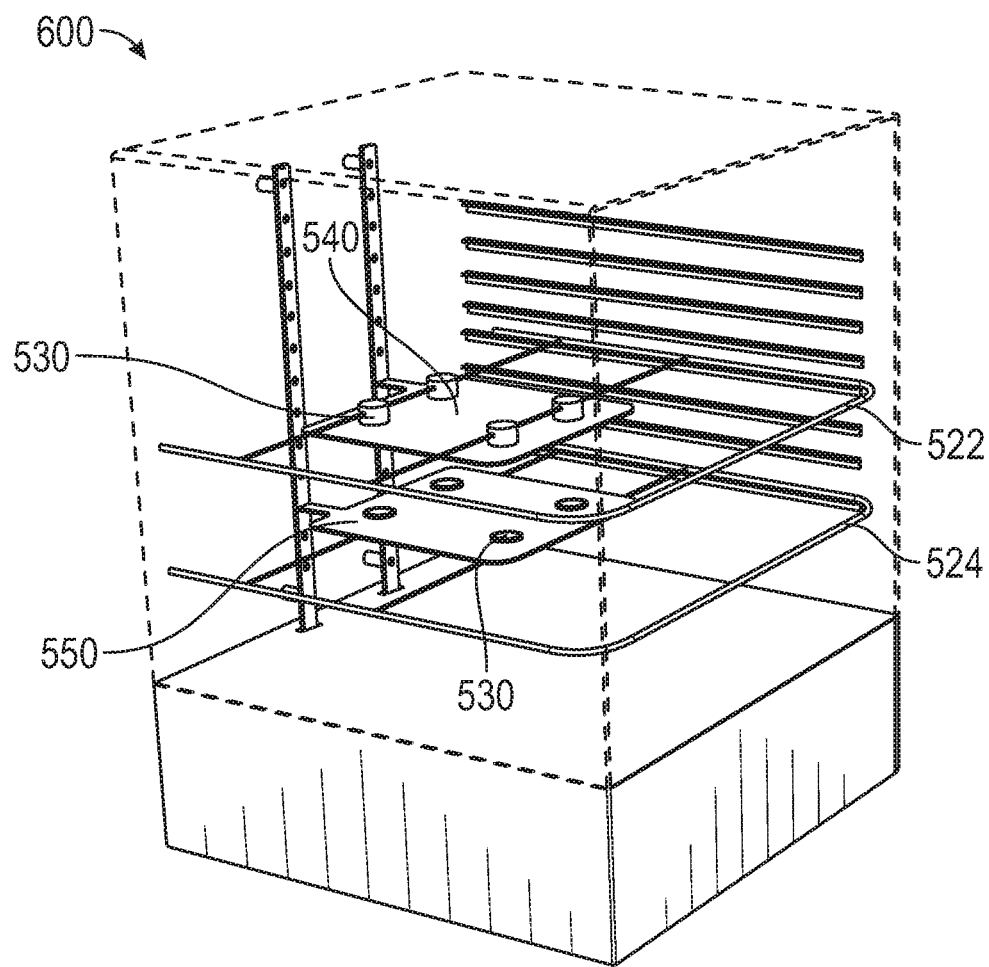
FIG. 6 is a perspective view of a modified version of the defrosting system of FIG. 5 in which standoff isolators are coupled to each of the two repositionable electrodes, in accordance with an example embodiment.
Figure 7:
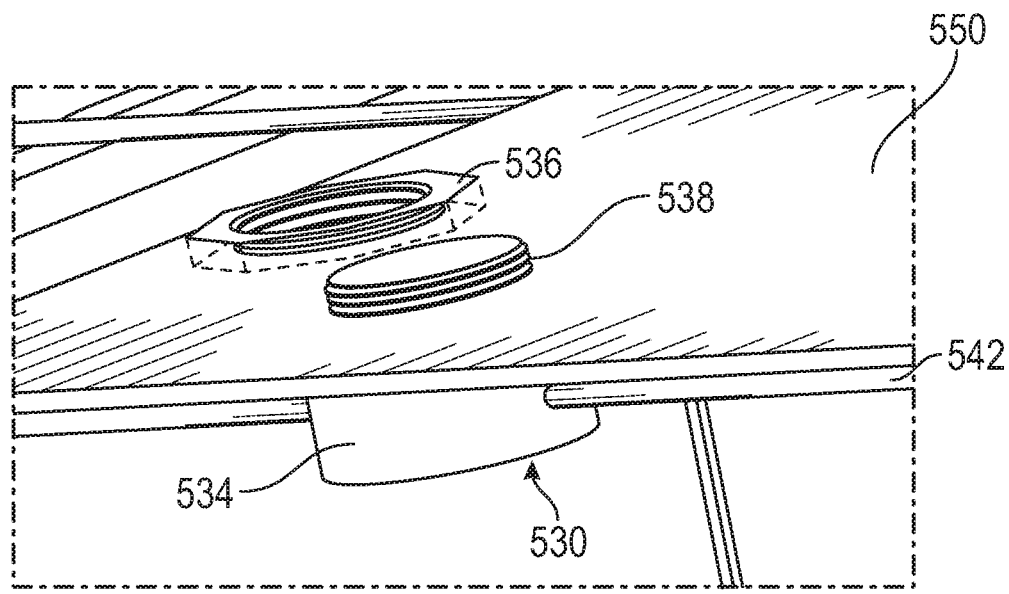
FIG. 7 is a close-up perspective view of one of the standoff isolators of the defrosting system of FIG. 6, in accordance with an example embodiment.

In some embodiments (e.g., those in which the rods 542 of the repositionable shelves 522 and 524 are electrically conductive), it may be desirable to prevent physical contact between the repositionable shelves 522 and 524 and the electrodes 540 and 550. FIGS. 6 and 7 show perspective views of a system 600 in which the electrodes 540 and 550 are attached to the repositionable shelves 522 and 524 using standoff isolators 530. First standoff isolators 530 provide separation between the lower repositionable electrode 550 and the repositionable shelf 524, and second standoff isolators 530 provide separation between the upper repositionable electrode 540 and the repositionable shelf 522. The standoff isolators 530 may be wholly or partially formed from dielectric material (e.g., heat resistant plastic material such as thermoset polymer, ceramic material such as alumina, or fiberglass material, such as fiberglass containing alumino-borosilicate glass, and/or mica).

Figure 8:
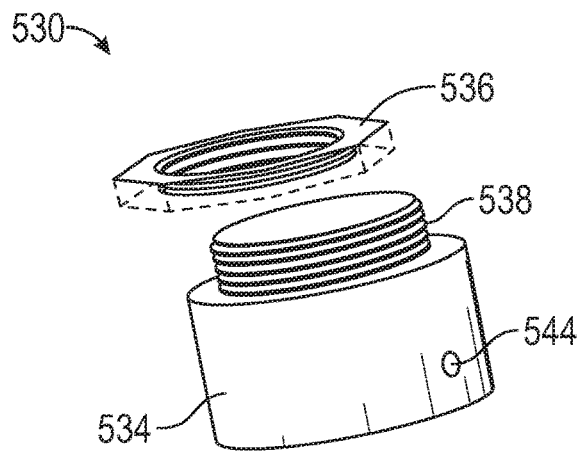
FIG. 8 is an isolated view of an illustrative standoff isolator, in accordance with an example embodiment.

As shown in FIGS. 7 and 8, each of the standoff isolators 530 may include a cylindrical portion 534 at one end and a threaded portion 538 at the opposite end. The threaded portion 538 may be smaller in diameter than the cylindrical portion 534. The cylindrical portion 534 may include a through-hole 544 that extends completely through the cylindrical portion 534. When assembled, one of the rods 542 may be inserted through the through-hole 544, and the threaded portion 538 may be inserted into a hole of either the upper repositionable electrode 540 or the lower repositionable electrode 550. A threaded cap 536 may be screwed onto the threaded portion 538 to hold the standoff isolator 530 in contact with the upper repositionable electrode 540 or the lower repositionable electrode 550, thereby affixing the standoff isolator 530 to the upper repositionable electrode 540 or the lower repositionable electrode 550.

By attaching the electrodes 540 and 550 to the repositionable shelves 522 and 524 with the standoff isolators 530, not only can electrical isolation be achieved between the electrodes 540 and 550 and the repositionable shelves 522 and 524, but capacitive coupling between the electrodes 540 and 550 and the repositionable shelves 522 and 524 may be reduced by the separation provided by the standoff isolators 530.

Figure 9:
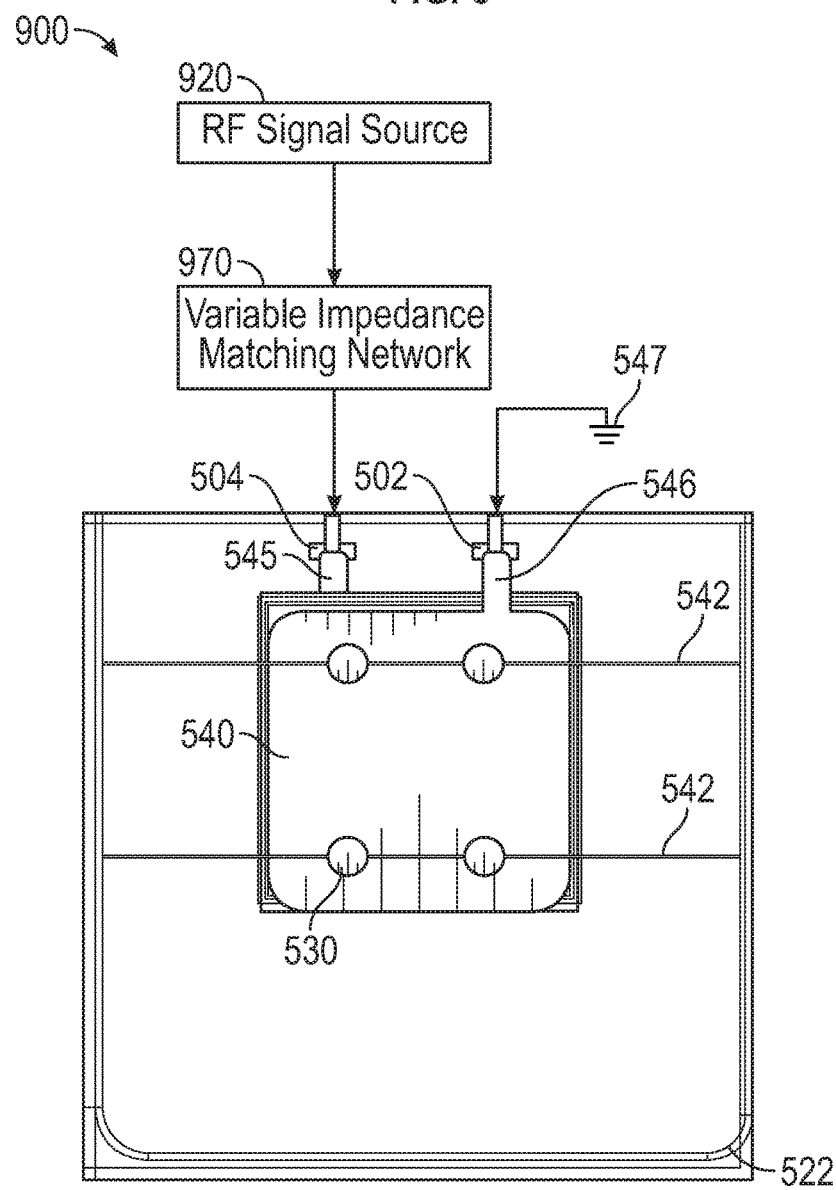
FIG. 9 is a top-down view of the defrosting system of FIG. 6 in a single-ended configuration, in accordance with an example embodiment.

The electrodes 540 and 550 may be electrically connected to the RF signal source, other voltage sources, or an electrical ground, depending on whether the system 500, 600 provides balanced or unbalanced RF signals to the electrodes 540, 550. For example, FIG. 9 shows a top-down view of an embodiment in which the system 900 provides an unbalanced RF signal to the electrodes. The upper repositionable electrode 540 includes a protrusion 546 that extends between the main body of the upper repositionable electrode 540 toward the bus bar 502. The plug (or other type of first connector portion) of the upper repositionable electrode 540 may be located at an end of the protrusion 546, and may be electrically connected to the electrode 540. The bus bar 502, and more specifically a port or other connector portion of the bus bar 502, may be electrically coupled to an electrical ground terminal 547, thereby providing an electrical path to ground for the upper repositionable electrode 540 when the corresponding connector portions of the electrode 540 and bus bar 502 are physically and electrically coupled together. Alternatively, the bus bar 502 may be coupled to a voltage source, which may, for example, supply a common voltage. In an alternate embodiment, the upper repositionable electrode 540 may be electrically grounded through a direct electrical connection to a wall of the containment structure 566, rather than through the bus bar 502.

The lower repositionable electrode 550 includes a protrusion 545 that extends between the main body of the lower repositionable electrode 550 toward the bus bar 504. The plug (or other type of first connector portion) of the lower repositionable electrode 550 may be located at an end of the protrusion 545, and may be electrically connected to the electrode 550. The bus bar 504, and more specifically a port or other connector portion of the bus bar 504, may be electrically coupled to an RF signal source 920 (e.g., RF signal source 320, FIG. 3) through a variable impedance matching network 970 (e.g., variable impedance matching network 370, FIG. 3). In this way, RF signals generated by the RF signal source 920 may be received by the lower repositionable electrode 550 through the bus bar 504 (i.e., through the corresponding connector portions of the electrode 550 and bus bar 504).

Figure 10:
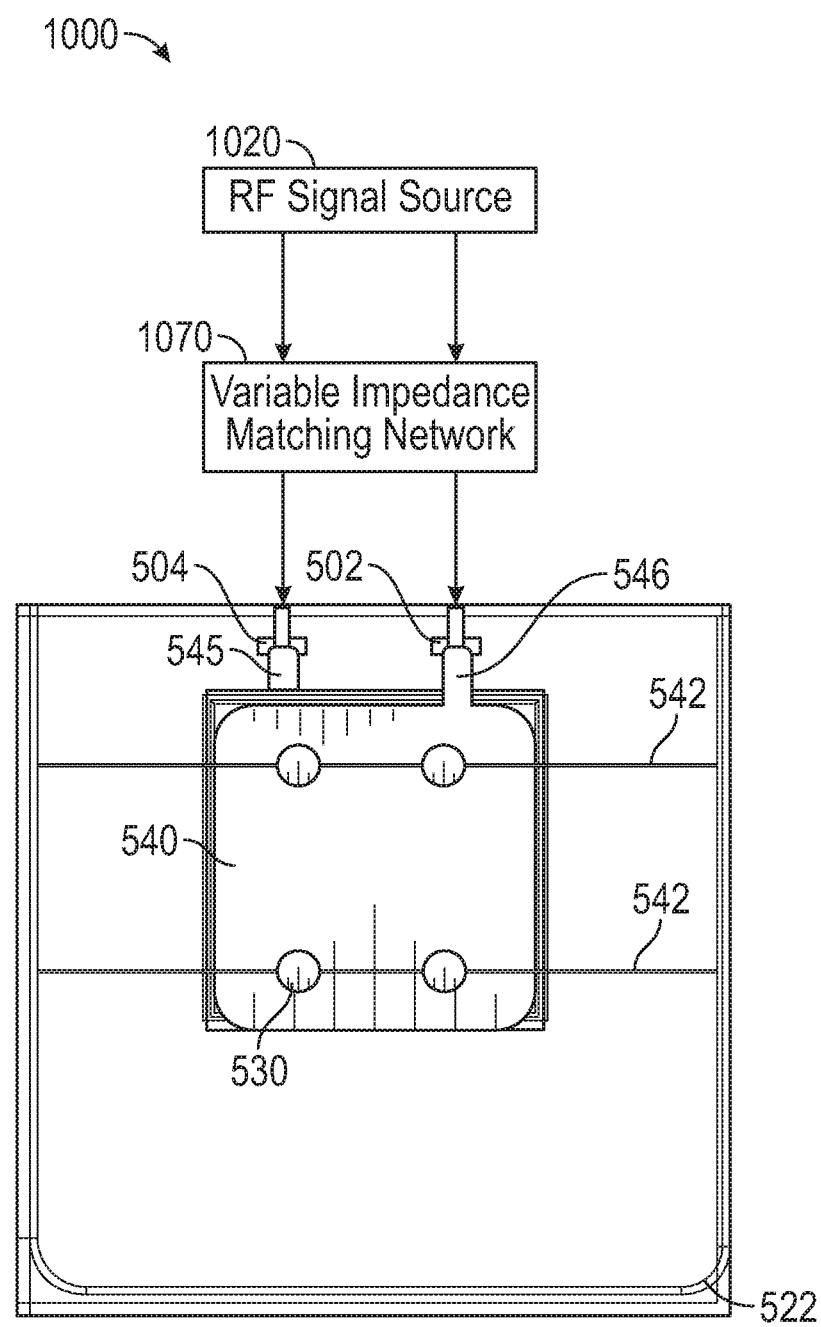
FIG. 10 is a top-down view of the defrosting system of FIG. 6 in a double-ended configuration, in accordance with another example embodiment.

FIG. 10 shows a top-down view of an embodiment in which the system 1000 provides balanced RF signals to the electrodes 540, 550. The protrusion 546 extends between the main body of the upper repositionable electrode 540 toward the bus bar 502. The protrusion 545 extends between the main body of the lower repositionable electrode 550 toward the bus bar 504. Both bus bars 502 and 504 may be electrically coupled to the RF signal source 1020 (e.g., RF signal source 420, FIG. 4) via separate paths through the variable impedance matching network 1070 (e.g., variable impedance matching network 470, FIG. 4). In this way, the lower repositionable electrode 550, when physically and electrically coupled to bus bar 504, may receive a first balanced RF signal from the RF signal source 1020 through the bus bar 504, and the upper repositionable electrode 540, when physically and electrically coupled to bus bar 502, may receive a second balanced RF signal from the RF signal source 1020 through the bus bar 502.

Figure 11:
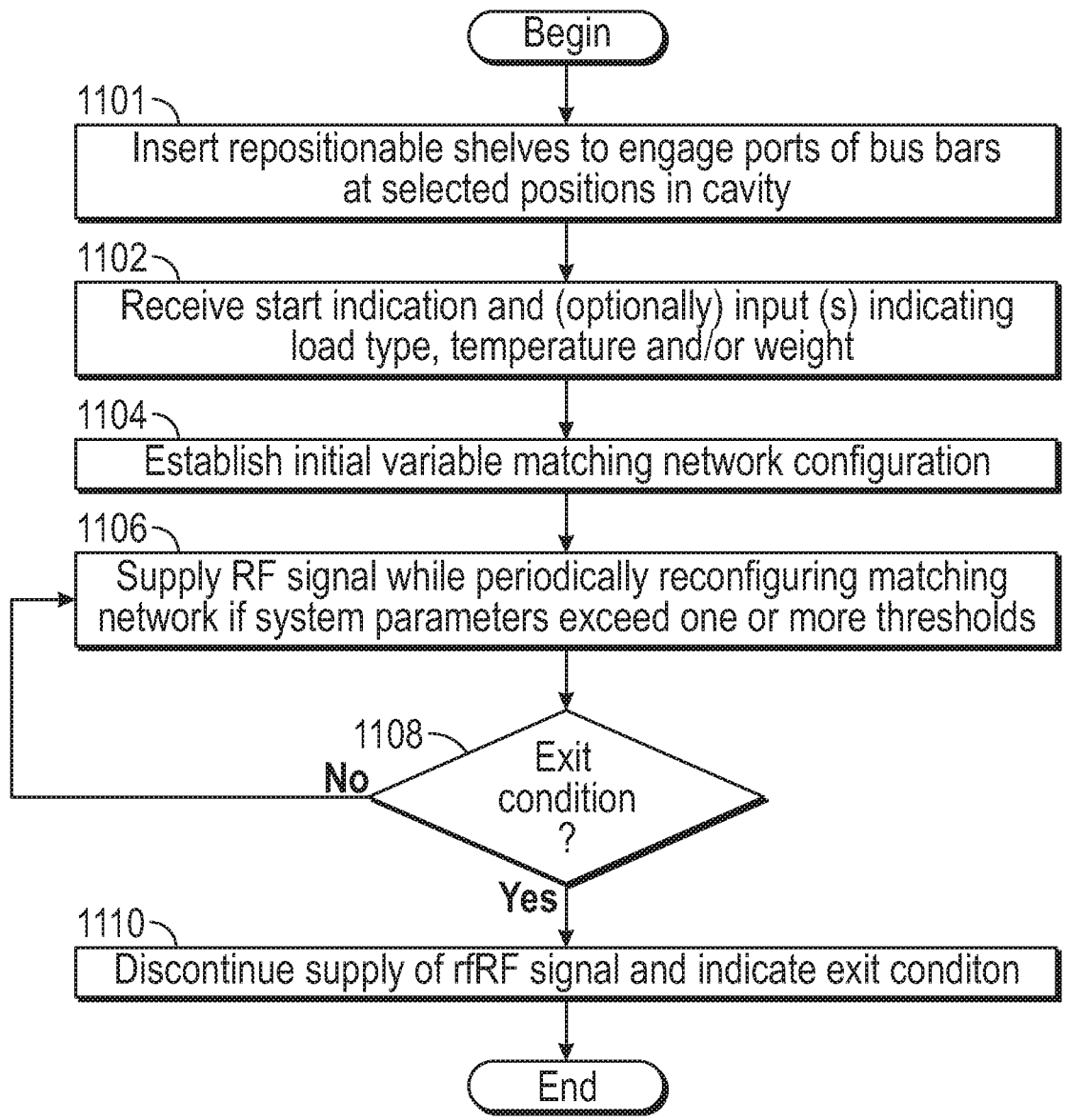
FIG. 11 is a flowchart of a method of operating a defrosting system where the defrosting system includes a self-oscillating signal source, in accordance with an example embodiment.

Now that embodiments of the electrical and physical aspects of defrosting systems have been described, various embodiments of methods for operating such defrosting systems will now be described in conjunction with FIG. 11. More specifically, FIG. 11 is a flowchart of a method of operating a defrosting system (e.g., system 100, 210, 220, 300, 400, 500, 600, 900, 1000, FIGS. 1-6, 9, 10) with dynamic load matching, in accordance with an example embodiment.

The method may begin, in block 1101, when one or more repositionable shelves (e.g., repositionable shelves 123, 124, 323, 324, 423, 424, 522, 524, FIGS. 1, 3-6, 9, 10) are inserted into the system's defrosting cavity (e.g., cavity 110, 360, 460, 560, FIGS. 1, 3-6, 9, 10) at selected position(s) to engage with support structures (e.g., support structures 122, 322, 422, 516, 518, FIGS. 1, 3-6, 9, 10) disposed at side walls of a containment structure (e.g., containment structure 366, 466, 566, FIGS. 3-6, 9, 10) of the system. For example, each repositionable shelf may be inserted onto support structures such that a first connector portion (e.g., a plug) coupled to an electrode (e.g., electrodes 170, 172, 340, 372, 440, 472, 540, 550, FIGS. 1, 3-6, 9, 10) of the repositionable shelf is aligned with and inserted into a second connector portion (e.g., a port 506, 508) of a corresponding bus bar (e.g., bus bar 126, 128, 502, 504, FIGS. 1, 5, 6, 9, 10) that is disposed at a wall of the containment structure. The bus bar may be at least partially electrically conductive, and the electrode may be electrically connected to a ground terminal or to an RF signal source (e.g., RF signal source 320, 420, 920, 1020, FIGS. 3, 4, 9, 10) through the bus bar when plugged into the port of the bus bar. For example, in an embodiment with two repositionable shelves, a user may insert each repositionable shelf at a respective selected position in the containment structure, such that the amount of empty space between the repositionable shelves is minimized, while still leaving enough space for a load of a given size to be placed on the lower of the two repositionable shelves with a minimal distance between a top of the load and the upper of the two repositionable shelves.

At block 1102, the system controller (e.g., system controller 312, 412, FIGS. 3, 4) receives an indication that a defrosting operation should start. Such an indication may be received, for example, after a user has place a load (e.g., load 364, 464, 564, FIGS. 3-5) into the system's defrosting cavity (e.g., cavity 360, 460, 560, FIGS. 3-5, 6), has sealed the cavity (e.g., by closing a door or drawer), and has pressed a start button (e.g., of the user interface 380, 480, FIGS. 3, 4). In an embodiment, sealing of the cavity may engage one or more safety interlock mechanisms, which when engaged, indicate that RF power supplied to the cavity will not substantially leak into the environment outside of the cavity. As will be described later, disengagement of a safety interlock mechanism may cause the system controller immediately to pause or terminate the defrosting operation.

According to various embodiments, the system controller optionally may receive additional inputs indicating the load type (e.g., meats, liquids, or other materials), the initial load temperature, and/or the load weight. For example, information regarding the load type may be received from the user through interaction with the user interface (e.g., by the user selecting from a list of recognized load types). Alternatively, the system may be configured to scan a barcode visible on the exterior of the load, or to receive an electronic signal from an RFID device on or embedded within the load. Information regarding the initial load temperature may be received, for example, from one or more temperature sensors and/or IR sensors (e.g., sensors 390, 490, FIGS. 3, 4) of the system. Information regarding the load weight may be received from the user through interaction with the user interface, or from a weight sensor (e.g., one of sensors 390, 490, FIGS. 3, 4) of the system. As indicated above, receipt of inputs indicating the load type, initial load temperature, and/or load weight is optional, and the system alternatively may not receive some or all of these inputs.

In block 1104, the system controller provides control signals to the variable matching network (e.g., network 370, 470, 970, 1070, FIGS. 3, 4, 9, 10) to establish an initial configuration or state for the variable matching network. The control signals affect the values of various component values (e.g., inductances, resistances, and/or capacitances) within the variable matching network. For example, the control signals may affect the states of bypass switches, which are responsive to the control signals from the system controller.

Once the initial variable matching network configuration is established, the system controller may, at block 1106 perform a process of adjusting, if necessary, the configuration of the variable impedance matching network to find an acceptable or best match based on actual measurements that are indicative of the quality of the match. According to an embodiment, this process includes causing the RF signal source to supply a relatively low power RF signal through the variable impedance matching network to the electrode(s) (e.g., electrodes 340, 372, 440, 472, or 540, 550 FIGS. 3-6). The system controller may control the RF signal power level through control signals to the power supply and bias circuitry (e.g., circuitry 326, 426, FIGS. 3, 4), where the control signals cause the power supply and bias circuitry to provide supply and bias voltages to an input of the RF signal source that are consistent with the desired signal power level. For example, the relatively low power RF signal may be a signal having a power level in a range of about 10 W to about 20 W, although different power levels alternatively may be used. A relatively low power level signal during the match adjustment process is desirable to reduce the risk of damaging the cavity or load (e.g., if the initial match causes high reflected power), and to reduce the risk of damaging the switching components of the variable inductance networks (e.g., due to arcing across the switch contacts).

Power detection circuitry of the defrosting system then measures the reflected and (in some embodiments) forward power along the transmission path (e.g., path 328, 428, 430, FIGS. 3, 4) between the RF signal source and the electrode(s), and provides those measurements to the system controller. The system controller may then determine a ratio between the reflected and forward signal powers, and may determine the S11 parameter for the system based on the ratio. The system controller may store the received power measurements (e.g., the received reflected power measurements, the received forward power measurement, or both), and/or the calculated ratios, and/or S11 parameters for future evaluation or comparison, in an embodiment.

The system controller may periodically determine, based on the reflected power measurements, and/or the reflected-to-forward signal power ratio, and/or the S11 parameter, whether or not the match provided by the variable impedance matching network is acceptable (e.g., the reflected power is below a threshold, or the ratio is 10 percent or less, or the measurements or values compare favorably with some other criteria). Alternatively, the system controller may be configured to determine whether the match is the "best"

match. A "best" match may be determined, for example, by iteratively measuring the reflected RF power (and in some embodiments the forward reflected RF power) for all possible impedance matching network configurations (or at least for a defined subset of impedance matching network configurations), and determining which configuration results in the lowest reflected RF power and/or the lowest reflected-to-forward power ratio.

When the system controller determines that the match is not acceptable or is not the best match, the system controller may adjust the match by reconfiguring the variable impedance matching network. For example, this may be achieved by sending control signals to the variable impedance matching network, which cause the network to increase and/or decrease the variable component values (e.g., variable capacitances, resistances, and/or inductances) within the network. This reconfiguration of the variable impedance matching network may be repeated until a "best" match is determined.

Once an acceptable or best match is determined, the defrosting operation may commence via the supply of the RF signal by the RF signal source. For example, commencement of the defrosting operation may include increasing the power of the RF signal supplied by the RF signal source to a relatively high power RF signal. Once again, the system controller may control the RF signal power level through control signals to the power supply and bias circuitry, where the control signals cause the power supply and bias circuitry to provide supply and bias voltages to an input of the RF signal source that are consistent with the desired signal power level. For example, the relatively high power RF signal may be a signal having a power level in a range of about 50 W to about 500 W, although different power levels alternatively may be used.

The power detection circuitry may then periodically measure the reflected power and, in some embodiments, the forward power along the transmission path (e.g., path 328, 428, 430, FIGS. 3, 4) between the RF signal source and the electrode(s), and may provide those measurements to the system controller. The system controller again may determine a ratio between the reflected and forward signal powers, and may determine the S11 parameter for the system based on the ratio. The system controller may store the received power measurements, and/or the calculated ratios, and/or S11 parameters for future evaluation or comparison, in an embodiment. According to an embodiment, the periodic measurements of the forward and reflected power may be taken at a fairly high frequency (e.g., on the order of milliseconds) or at a fairly low frequency (e.g., on the order of seconds). For example, a fairly low frequency for taking the periodic measurements may be a rate of one measurement every 10 seconds to 20 seconds.

The system controller may determine, based on one or more reflected signal power measurements, one or more calculated reflected-to-forward signal power ratios, and/or one or more calculated S11 parameters, whether or not the match provided by the variable impedance matching network is acceptable. For example, the system controller may use a single reflected signal power measurement, a single calculated reflected-to-forward signal power ratio, or a single calculated S11 parameter in making this determination, or may take an average (or other calculation) of a number of previously-received reflected signal power measurements, previously-calculated reflected-to-forward power ratios, or previously-calculated S11 parameters in making this determination. To determine whether or not the match is acceptable, the system controller may compare the received reflected signal power, the calculated ratio, and/or S11 parameter to one or more corresponding thresholds, for example. For example, in one embodiment, the system controller may compare the received reflected signal power to a threshold of, for example, 5 percent (or some other value) of the forward signal power. A reflected signal power below 5 percent of the forward signal power may indicate that the match remains acceptable, and a ratio above 5 percent may indicate that the match is no longer acceptable. In another embodiment, the system controller may compare the calculated reflected-to-forward signal power ratio to a threshold of 10 percent (or some other value). A ratio below 10 percent may indicate that the match remains acceptable, and a ratio above 10 percent may indicate that the match is no longer acceptable. When the measured reflected power, or the calculated ratio or S11 parameter is greater than the corresponding threshold (i.e., the comparison is unfavorable), indicating an unacceptable match, then the system controller may initiate re-configuration of the variable impedance matching network.

When the system controller determines, based on one or more reflected power measurements, one or more calculated reflected-to-forward signal power ratios, and/or one or more calculated S11 parameters, that the match provided by the variable impedance matching network is still acceptable (e.g., the reflected power measurements, calculated ratio, or S11 parameter is less than a corresponding threshold, or the comparison is favorable), the system may evaluate whether or not an exit condition has occurred, in block 1108. In actuality, determination of whether an exit condition has occurred may be an interrupt driven process that may occur at any point during the defrosting process. However, for the purposes of including it in the flowchart of FIG. 11, the process is shown to occur after block 1106.

In any event, several conditions may warrant cessation of the defrosting operation. For example, the system may determine that an exit condition has occurred when a safety interlock is breached. Alternatively, the system may determine that an exit condition has occurred upon expiration of a timer that was set by the user (e.g., through user interface 380, 480, FIGS. 3, 4) or upon expiration of a timer that was established by the system controller based on the system controller's estimate of how long the defrosting operation should be performed. In still another alternate embodiment, the system may otherwise detect completion of the defrosting operation.

If an exit condition has not occurred, then the defrosting operation may continue by returning to block 1106. When an exit condition has occurred, then in block 1110, the system controller causes the supply of the RF signal by the RF signal source to be discontinued. For example, the system controller may disable the RF signal source (e.g., RF signal source 320, 420, FIGS. 3, 4) and/or may cause the power supply and bias circuitry to discontinue provision of the supply current. In addition, the system controller may send signals to the user interface that cause the user interface to produce a user-perceptible indicia of the exit condition (e.g., by displaying "door open" or "done" on a display device, or providing an audible tone). The method may then end.

It should be understood that the order of operations associated with the blocks depicted in FIG. 11 corresponds to an example embodiment, and should not be construed to limit the sequence of operations only to the illustrated order. Instead, some operations may be performed in different orders, and/or some operations may be performed in parallel.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

In an example embodiment, a thermal increase system with a cavity for containing a load may include a first repositionable electrode disposed in the cavity, a first bus bar disposed in the cavity, the first repositionable electrode being physically and electrically connectable to the first bus bar, a second repositionable electrode disposed in the cavity, a second bus bar disposed in the cavity and being physically and electrically connectable to the second bus bar, a plurality of shelf support structures disposed within the cavity that is configured to support the first and second repositionable electrodes at a plurality of heights within the cavity, and a radio frequency signal source electrically connected to one or both of the first repositionable electrode and the second repositionable electrode via the first bus bar and the second bus bar, respectively, the radio frequency signal source being configured to provide radio frequency energy to either or both of the first repositionable electrode and the second repositionable electrode. The first bus bar may include a first plurality of ports, the second bus bar includes a second plurality of ports, the first repositionable electrode plugs into one of the first plurality of ports, and the second repositionable electrode plugs into one of the second plurality of ports In one embodiment, the thermal increase system may include a variable impedance matching network coupled between the radio frequency signal source and either or both of the first repositionable electrode and the second repositionable electrode and having a variable impedance. The variable impedance matching network is configured to adjust the variable impedance based on one or more parameters of the radio frequency energy selected from reflected power, both forward and reflected power, and/or an S11 parameter.

In one embodiment, the thermal increase system may include a first repositionable shelf attached to the first repositionable electrode and a second repositionable shelf attached to the second repositionable electrode. The first repositionable shelf and the second repositionable shelf may be supported by the plurality of shelf support structures. The thermal increase system may include a first plurality of standoff isolators that attach the first repositionable shelf to the first repositionable electrode and that provide separation between the first repositionable shelf and the first repositionable electrode to electrically isolate the first repositionable shelf from the first repositionable electrode and a second plurality of standoff isolators that attach the second repositionable shelf to the second repositionable electrode, and that provide separation between the second repositionable shelf and the second repositionable electrode to electrically isolate the second repositionable shelf from the second repositionable electrode. A standoff isolator of the first plurality of standoff isolators may include a cylindrical portion at a first end of the standoff isolator, a threaded portion at a second end of the standoff isolator opposite the first end, the threaded portion being inserted through a hole in the first repositionable electrode, and a threaded cap screwed onto the threaded portion to affix the standoff isolator to the first repositionable electrode. The cylindrical portion of the standoff isolator may include a through-hole, and the first repositionable shelf may include a rod that extends through the through-hole to attach the standoff isolator to the first repositionable shelf.

In one embodiment, the radio frequency signal source may provide a first balanced radio frequency signal to the first repositionable electrode via the first bus bar, and to provide a second balanced radio frequency signal to the second repositionable electrode via the second bus bar.

In one embodiment, the second repositionable electrode is electrically connectable to a ground terminal through the second bus bar.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A thermal increase system with a cavity for containing a load, the thermal increase system comprising:
   a first repositionable electrode disposed in the cavity;
   a first bus bar disposed in the cavity, the first repositionable electrode being physically and electrically connectable to the first bus bar;
   a second repositionable electrode disposed in the cavity;
   a second bus bar disposed in the cavity, the second repositionable electrode being physically and electrically connectable to the second bus bar;
   a plurality of shelf support structures disposed within the cavity, wherein the plurality of shelf support structures is configured to support the first and second repositionable electrodes at a plurality of heights within the cavity; and
   a radio frequency signal source electrically connected to one or both of the first repositionable electrode and the second repositionable electrode via the first bus bar and the second bus bar, respectively, the radio frequency signal source being configured to provide radio frequency energy to either or both of the first repositionable electrode and the second repositionable electrode.

2. The thermal increase system of claim 1, wherein the first bus bar includes a first plurality of ports, the second bus bar includes a second plurality of ports, the first repositionable electrode plugs into one of the first plurality of ports, and the second repositionable electrode plugs into one of the second plurality of ports.

3. The thermal increase system of claim 1, further comprising:
 a variable impedance matching network coupled between the radio frequency signal source and either or both of the first repositionable electrode and the second repositionable electrode and having a variable impedance, wherein the variable impedance matching network is configured to adjust the variable impedance based on one or more parameters of the radio frequency energy selected from the group consisting of: reflected power, both forward and reflected power, and an S11 parameter.

4. The thermal increase system of claim 1, further comprising:
 a first repositionable shelf attached to the first repositionable electrode; and
 a second repositionable shelf attached to the second repositionable electrode, wherein the first repositionable shelf and the second repositionable shelf are supported by the plurality of shelf support structures.

5. The thermal increase system of claim 4, further comprising:
 a first plurality of standoff isolators that attach the first repositionable shelf to the first repositionable electrode and that provide separation between the first repositionable shelf and the first repositionable electrode to electrically isolate the first repositionable shelf from the first repositionable electrode; and
 a second plurality of standoff isolators that attach the second repositionable shelf to the second repositionable electrode, and that provide separation between the second repositionable shelf and the second repositionable electrode to electrically isolate the second repositionable shelf from the second repositionable electrode.

6. The thermal increase system of claim 5, wherein a standoff isolator of the first plurality of standoff isolators comprises:
 a cylindrical portion at a first end of the standoff isolator;
 a threaded portion at a second end of the standoff isolator opposite the first end, the threaded portion being inserted through a hole in the first repositionable electrode; and
 a threaded cap screwed onto the threaded portion to affix the standoff isolator to the first repositionable electrode.

7. The thermal increase system of claim 6, wherein the cylindrical portion of the standoff isolator comprises a through-hole, and the first repositionable shelf comprises a rod that extends through the through-hole to attach the standoff isolator to the first repositionable shelf.

8. The thermal increase system of claim 1, wherein the radio frequency signal source is further configured to provide a first balanced radio frequency signal to the first repositionable electrode via the first bus bar, and to provide a second balanced radio frequency signal to the second repositionable electrode via the second bus bar.

9. The thermal increase system of claim 1, wherein the second repositionable electrode is electrically connectable to a ground terminal through the second bus bar.

10. A system, comprising:
 a containment structure forming a cavity;
 a first bus bar disposed in the cavity, the first bus bar including a first plurality of ports at a variety of heights from a bottom of the cavity;
 a first repositionable electrode disposed in the cavity at a first selectable height, one of the first plurality of ports receiving a first connector portion of the first repositionable electrode to electrically connect the first repositionable electrode to a first port of the first plurality of ports of the first bus bar;
 a second repositionable electrode disposed in the cavity at a second selectable height that is different from the first selectable height so that the first and second repositionable electrodes are parallel to each other; and
 a radio frequency signal source that supplies radio frequency energy to either or both of the first repositionable electrode or the second repositionable electrode.

11. The system of claim 10, further comprising:
 a second bus bar disposed in the cavity, the second bus bar including a second plurality of ports, one of the second plurality of ports receiving a second connector portion of the second repositionable electrode to electrically connect the second repositionable electrode to a second port of the second plurality of ports of the second bus bar.

12. The system of claim 11, wherein the second repositionable electrode is electrically connectable to ground through the second bus bar.

13. The system of claim 11, further comprising:
 a plurality of support structures disposed at different heights at interior walls of the cavity;
 a first repositionable shelf supportable by a first subset of the plurality of support structures;
 a second repositionable shelf supportable by a second subset of the plurality of support structures;
 a first plurality of dielectric standoff isolators that attaches the first repositionable shelf to the first repositionable electrode and that provides separation between the first repositionable shelf and the first repositionable electrode; and
 a second plurality of dielectric standoff isolators that attaches the second repositionable shelf to the second repositionable electrode and that provides separation between the second repositionable shelf and the second repositionable electrode.

14. The system of claim 13, wherein a dielectric standoff isolator of the first plurality of dielectric standoff isolators comprises:
 a cylindrical portion at a first end of the dielectric standoff isolator;
 a threaded portion at a second end of the dielectric standoff isolator opposite the first end, the threaded portion being inserted through a hole in the first repositionable electrode; and
 a threaded cap screwed onto the threaded portion to affix the dielectric standoff isolator to the first repositionable electrode.

15. The system of claim 11, wherein the radio frequency signal source is electrically connected to the second bus bar and supplies radio frequency energy to the second repositionable electrode through the second bus bar.

16. The system of claim 10, further comprising:

a variable impedance matching network coupled between the radio frequency signal source and either or both of the first repositionable electrode and the second repositionable electrode and having a variable impedance, wherein the variable impedance matching network is configured to adjust the variable impedance based on one or more parameters of the radio frequency signal selected from the group consisting of: reflected power, both forward and reflected power, and an S11 parameter.

17. A thermal increase system comprising:

a containment structure that forms a cavity;

support structures disposed at interior walls of the cavity;

a first repositionable shelf supportable by a first subset of the support structures;

an upper electrode attached to the first repositionable shelf;

a second repositionable shelf supportable by a second subset of the support structures;

a lower electrode attached to the second repositionable shelf; and a radio frequency signal source electrically connected to either or both of the upper electrode and the lower electrode, the radio frequency signal source being configured to provide radio frequency energy to either or both of the upper electrode and the lower electrode.

18. The thermal increase system of claim 17, further comprising:

a first plurality of standoff isolators that attach the first repositionable shelf to the upper electrode and that separate the first repositionable shelf from the upper electrode; and a second plurality of standoff isolators that attach the second repositionable shelf to the lower electrode and that separate the second repositionable shelf from the second electrode.

19. The thermal increase system of claim 18, wherein the first plurality of standoff isolators comprises dielectric material and electrically insulates the first repositionable shelf from the upper electrode.

20. The thermal increase system of claim 17, further comprising:

a first bus bar disposed at a wall of the containment structure, the first bus bar including a first plurality of ports, one of the first plurality of ports receiving a first connector portion of the upper electrode to electrically connect the upper electrode to the first bus bar; and a second bus bar disposed at the wall of the containment structure, the second bus bar including a second plurality of ports, one of the second plurality of ports receiving a second connector portion of the lower electrode to electrically connect the lower electrode to the second bus bar.

* * * * *